United States Patent
Honda et al.

(10) Patent No.: US 11,115,560 B2
(45) Date of Patent: Sep. 7, 2021

(54) IMAGE PROCESSING DEVICE, CONTROL METHOD AND CONTROL PROGRAM FOR MORE ACCURATELY REMOVING A BACKGROUND PATTERN FROM AN IMAGE

(71) Applicant: PFU LIMITED, Kahoku (JP)

(72) Inventors: Keiji Honda, Kahoku (JP); Kiyoto Kosaka, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 17/058,577

(22) PCT Filed: Sep. 28, 2018

(86) PCT No.: PCT/JP2018/036484
§ 371 (c)(1),
(2) Date: Nov. 24, 2020

(87) PCT Pub. No.: WO2020/065980
PCT Pub. Date: Apr. 2, 2020

(65) Prior Publication Data
US 2021/0127032 A1   Apr. 29, 2021

(51) Int. Cl.
*H04N 1/38* (2006.01)
*H04N 1/387* (2006.01)
*G06T 5/50* (2006.01)

(52) U.S. Cl.
CPC ........... *H04N 1/387* (2013.01); *H04N 1/3872* (2013.01); *G06T 5/50* (2013.01)

(58) Field of Classification Search
CPC combination set(s) only.
See application file for complete search history.

(56) References Cited

FOREIGN PATENT DOCUMENTS

| JP | H10-143607 A | 5/1998 |
|---|---|---|
| JP | 2001-111816 A | 4/2001 |

(Continued)

OTHER PUBLICATIONS

International Search Report dated Jun. 12, 2018 for corresponding PCT Application No. PCT/JP2018/036484 (3 pages) with English Translation (2 pages).

(Continued)

*Primary Examiner* — Barbara D Reinier
(74) *Attorney, Agent, or Firm* — Lewis Roca Rothgerber Christie LLP

(57) ABSTRACT

Provided are an image processing apparatus, a control method, and a control program for more accurately removing the background pattern from the image including the background pattern. An image processing apparatus includes an acquisition module to acquire an input image, a multi-valued image generating module to generate a multi-valued image from the input image, a binary image generating module to generate a binary image acquired by binarizing the input image, a detection module to detect a thin line having a width equal to or less than a predetermined number of pixels from the multi-valued image, a background pattern removal image generating module to generate a background pattern removal image in which the thin line is removed from the binary image, based on the thin line detected from the multi-valued image, and an output module to output the background pattern removal image or information generated using the background pattern removal image.

20 Claims, 17 Drawing Sheets

(56) References Cited

FOREIGN PATENT DOCUMENTS

| | | |
|---|---|---|
| JP | 2005-301713 A | 10/2005 |
| JP | 2012-248948 A | 12/2012 |
| JP | 2017-27365 A | 2/2017 |

OTHER PUBLICATIONS

Written Opinion dated Dec. 18, 2018 for corresponding PCT Application No. PCT/JP2018/036484 (4 pages) with English Translation (4 pages).
International Preliminary Report on Patentability dated Mar. 23, 2021 for corresponding PCT Application No. PCT/JP2018/036484 (5 pages) with English Translation (5 pages).

IMAGE PROCESSING DEVICE, CONTROL METHOD AND CONTROL PROGRAM FOR MORE ACCURATELY REMOVING A BACKGROUND PATTERN FROM AN IMAGE

CROSS-REFERENCE TO RELATED APPLICATION(S)

This application is a U.S. National Phase Patent Application and claims priority to and the benefit of International Application Number PCT/JP2018/036484, filed on Sep. 28, 2018, the entire contents of which are incorporated herein by reference.

FIELD

The present disclosure relates to an image processing apparatus, a control method, and a control program, and particularly to an image processing apparatus, a control method, and a control program for processing an image including a background pattern.

BACKGROUND

In a company in which a person in charge manually converts a business form such as an invoice into data, a demand for efficiency improvement of work for data conversion of business forms is rising, since the business burden of the person in charge increases when data conversion of a huge number of business forms is necessary. In order to efficiency improve work for data conversion of the business forms, it is necessary for a computer to correctly recognize characters described in the business forms. However, when characters are printed on a paper including a background pattern in the business form, the characters may not be recognized correctly.

A form discriminating apparatus to discriminate a type of documents from image data is disclosed (see PTL 1). The form discriminating apparatus extracts a group of line-shaped blobs in which blobs in which directions of line segments are common, branches are not detected from the line segments, and a width of the line segments are constant are distributed at a predetermined density or more, among line-shaped blobs included in the image data, and removes it from the image data.

Further, a document image processing apparatus to detect and remove subtle changes in a pattern printed on a document is disclosed (see PTL 2). The document image processing apparatus deletes a black run as line segment noise when there is a white area on the upper and lower scan lines of the black run.

Further, an image processing apparatus to separate a character part and a background part in an image is disclosed (see PTL 3). The image processing apparatus determines whether each connected component is the character part or the background part by comparing a line width of each connected component in an original image data with a threshold value, and removes a connected component part in the original image data when the connected component is the background part.

CITATION LIST

Patent Literature

[PTL 1] Japanese Unexamined Patent Application Publication (Kokai) No. 2017-27365

[PTL 2] Japanese Unexamined Patent Application Publication (Kokai) No. 2001-111816

[PTL 3] Japanese Unexamined Patent Application Publication (Kokai) No. H10-143607

SUMMARY

The image processing apparatus is required to more accurately remove the background pattern from an image including the background pattern.

An object of an image processing apparatus, a control method and a control program is to more accurately remove the background pattern from the image including the background pattern According to some embodiments, an image processing apparatus includes an acquisition module to acquire an input image, a multi-valued image generating module to generate a multi-valued image from the input image, a binary image generating module to generate a binary image acquired by binarizing the input image, a detection module to detect a thin line having a width equal to or less than a predetermined number of pixels from the multi-valued image, a background pattern removal image generating module to generate a background pattern removal image in which the thin line is removed from the binary image, based on the thin line detected from the multi-valued image, and an output module to output the background pattern removal image or information generated using the background pattern removal image.

According to some embodiments, a control method of an image processing apparatus including an output device, includes acquiring, by the image processing apparatus, an input image, generating a multi-valued image from the input image, generating a binary image acquired by binarizing the input image, detecting a thin line having a width equal to or less than a predetermined number of pixels from the multi-valued image, generating a background pattern removal image in which the thin line is removed from the binary image, based on the thin line detected from the multi-valued image, and outputting the background pattern removal image or information generated using the background pattern removal image from the output device.

According to some embodiments, a control program of an image processing apparatus including an output device, causes the image processing apparatus to execute acquiring an input image, generating a multi-valued image from the input image, generating a binary image acquired by binarizing the input image, detecting a thin line having a width equal to or less than a predetermined number of pixels from the multi-valued image, generating a background pattern removal image in which the thin line is removed from the binary image, based on the thin line detected from the multi-valued image, and outputting the background pattern removal image or information generated using the background pattern removal image from the output device.

According to the present embodiment, the image processing apparatus, the control method and the control program can more accurately remove the background pattern from the image including the background pattern.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

DESCRIPTION OF EMBODIMENTS

Hereinafter, an image processing apparatus, a control method and a control program according to an embodiment, will be described with reference to the drawings. However, it should be noted that the technical scope of the invention is not limited to these embodiments, and extends to the inventions described in the claims and their equivalents.

Figure 1:
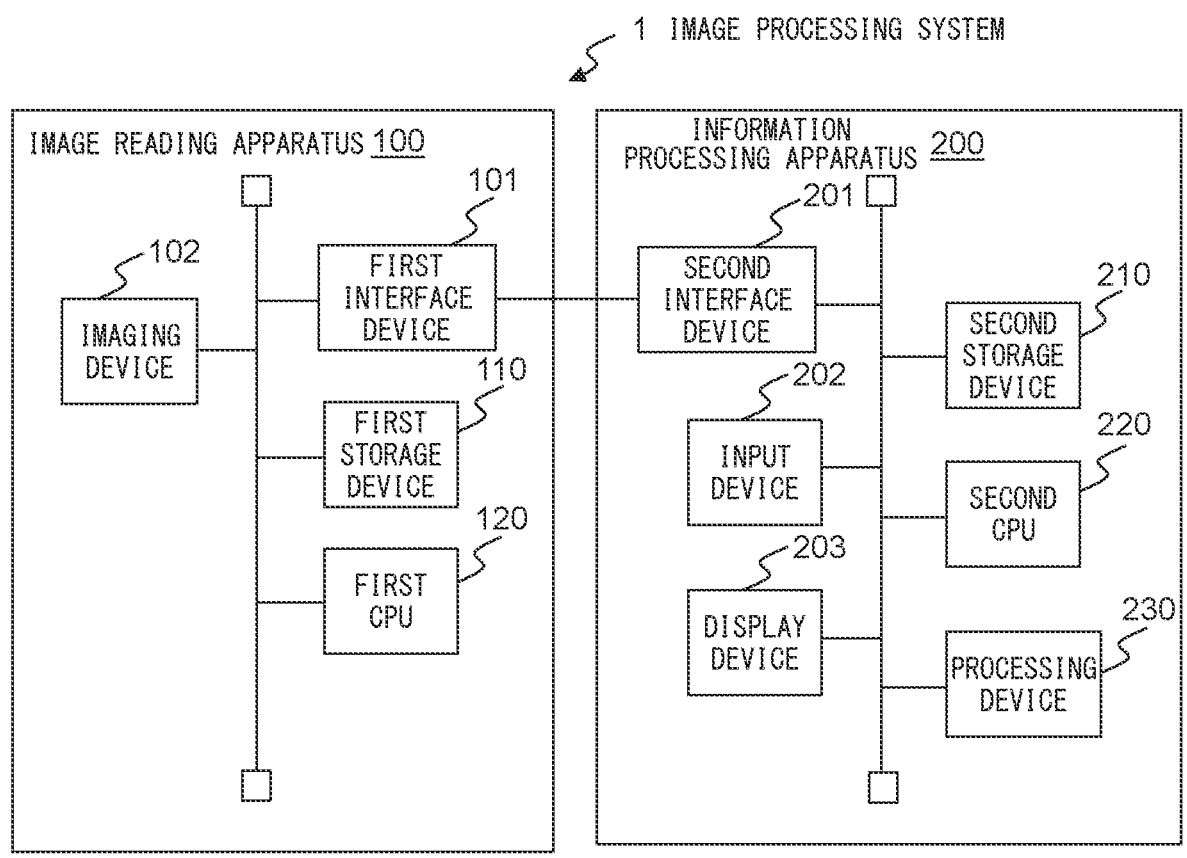
FIG. 1 is a diagram illustrating a schematic configuration of an image processing system 1 according to an embodiment.

FIG. 1 is a diagram illustrating a schematic configuration of an image processing system according to an embodiment. As shown in FIG. 1, the image processing system 1 includes an image reading apparatus 100 and an information processing apparatus 200.

The image reading apparatus 100 is, for example, a scanner device, etc. The image reading apparatus 100 is connected to the information processing apparatus 200. The information processing apparatus 200 is an example of an image processing apparatus, for example, a personal computer, etc.

The image reading apparatus 100 includes a first interface device 101, an imaging device 102, a first storage device 110, and a first CPU (Control Processing Unit) 120.

The first interface device 101 has an interface circuit according to a serial bus such as a USB (Universal Serial Bus) and electrically connects to the information processing apparatus 200 to transmit and receive image data and various types of information. Instead of the first interface device 101, a communication device having an antenna for transmitting and receiving a wireless signal and a wireless communication interface circuit for transmitting and receiving signals through a wireless communication line according to a predetermined communication protocol may be used. For example, the predetermined communication protocol is a wireless local area network (LAN).

The imaging device 102 includes an image capturing sensor of a reduction optical system type including an image capturing element constituted of charge coupled devices (CCDs) arranged linearly in the main scanning direction. Further, the imaging device 102 includes a light source for irradiating light, a lens for forming an image on the image capturing element, and an A/D converter for amplifying and analog/digital (A/D) converting an electrical signal output from the capturing element. In the imaging device 102, the image capturing sensor images a surface of a conveyed paper to generate and output an analog image signal, and the A/D converter performs A/D conversion of the analog image signal to generate and output a digital input image. The input image is a color multi-valued image in which each pixel data is 24-bit data composed of R (red) values, G (green) values and B (blue) values represented by 8 bits for each RGB color, for example. Note that a contact image sensor (CIS) of an unmagnification optical system type including an image capturing element constituted of a complementary metal oxide semiconductor (CMOS) instead of the CCD may be used.

The storage device 110 includes memory devices such as a RAM (Random Access Memory), a ROM (Read Only Memory), etc., a fixed disk device such as a hard disk, or a portable storage device such as a flexible disk, an optical disk, etc. The storage device 110 stores computer programs, databases, tables, etc., used for various kinds of processing of the image processing apparatus 100. The computer program may be installed on the storage device 301 from a computer-readable, non-transitory medium such as a compact disc read only memory (CD-ROM), a digital versatile disc read only memory (DVD-ROM), or the like by using a well-known setup program etc. The first storage device 110 stores an input image, etc., generated by the imaging device 102.

The first CPU 120 operates according to a program stored in advance in the first storage device 110. Note that a digital signal processor (DSP), a large scale integration (LSI), etc., may be used instead of the first CPU 120. Alternatively, an Application Specific Integrated Circuit (ASIC), a field-programming gate array (FPGA) etc., may be used instead of the first CPU 120.

The first CPU 120 is connected to the first interface device 101, the imaging device 102 and the storage device 110, etc., and controls each of the modules. The first CPU 120 performs document reading control of the imaging device 102, data transmission and reception control with the information processing apparatus 200 via the first interface device 101, etc.

The information processing apparatus 200 includes a second interface device 201, an input device 202, a display device 203, a second storage device 210, a second CPU 220, and a processing device 230. Hereinafter, each part of the information processing apparatus 200 will be described in detail.

The second interface device 201 has an interface circuit similar to the first interface device 101 of the image reading apparatus 100 and connects the information processing apparatus 200 and the image reading apparatus 100. Further, instead of the second interface device 201, a communication device having an antenna for transmitting and receiving a wireless signal and a wireless communication interface circuit for transmitting and receiving signals through a wireless communication line according to a predetermined communication protocol such as wireless LAN, may be used.

The input device 202 includes an input device such as a keyboard, a mouse, and an interface circuit that acquires a signal from the input device, and outputs a signal depending on the user input to the second CPU 220.

The display device 203 is an example of an output device. The display device 203 includes a display constituted of a liquid crystal, an organic electro-luminescence (EL), etc., and an interface circuit that outputs image data to the display, is connected to the second storage device 210, and outputs image data stored in the second storage device 210 to the display.

The second storage device 210 includes memory devices, a fixed disk device, a portable storage device, etc., similar to the first storage device 110 of the image reading apparatus 100. The second storage device 210 stores computer programs, databases, tables, etc., used for various kinds of processing of the information processing apparatus 200. The computer program may be installed on the storage device 301 from a computer-readable, non-transitory medium such as a CD-ROM, a DVD-ROM, or the like by using a well-known setup program etc. The second storage device 210 stores the input image received from the image reading apparatus 100 and various processing images processed on the input image by the processing device 230.

The second CPU 220 operates according to a program stored in advance in the second storage device 210. Note that a DSP, a LSI, an ASIC, a FPGA, etc., may be used instead of the second CPU 220.

The second CPU 220 is connected to the second interfacing device 201, the input device 202, the display device 203, the second storage device 210 and the processing device 230, etc., and controls each of the modules. The second CPU 220 performs data transmission and reception control with the image reading apparatus 100 via the second interface device 201, input control of the input device 202, display control of the display device 203, control of image processing by the processing device 230, etc.

The processing device 230 executes predetermined image processing on the input image. The processing device 230, a CPU, a DSP, a LSI, an ASIC or a FPGA, etc.

Figure 2:
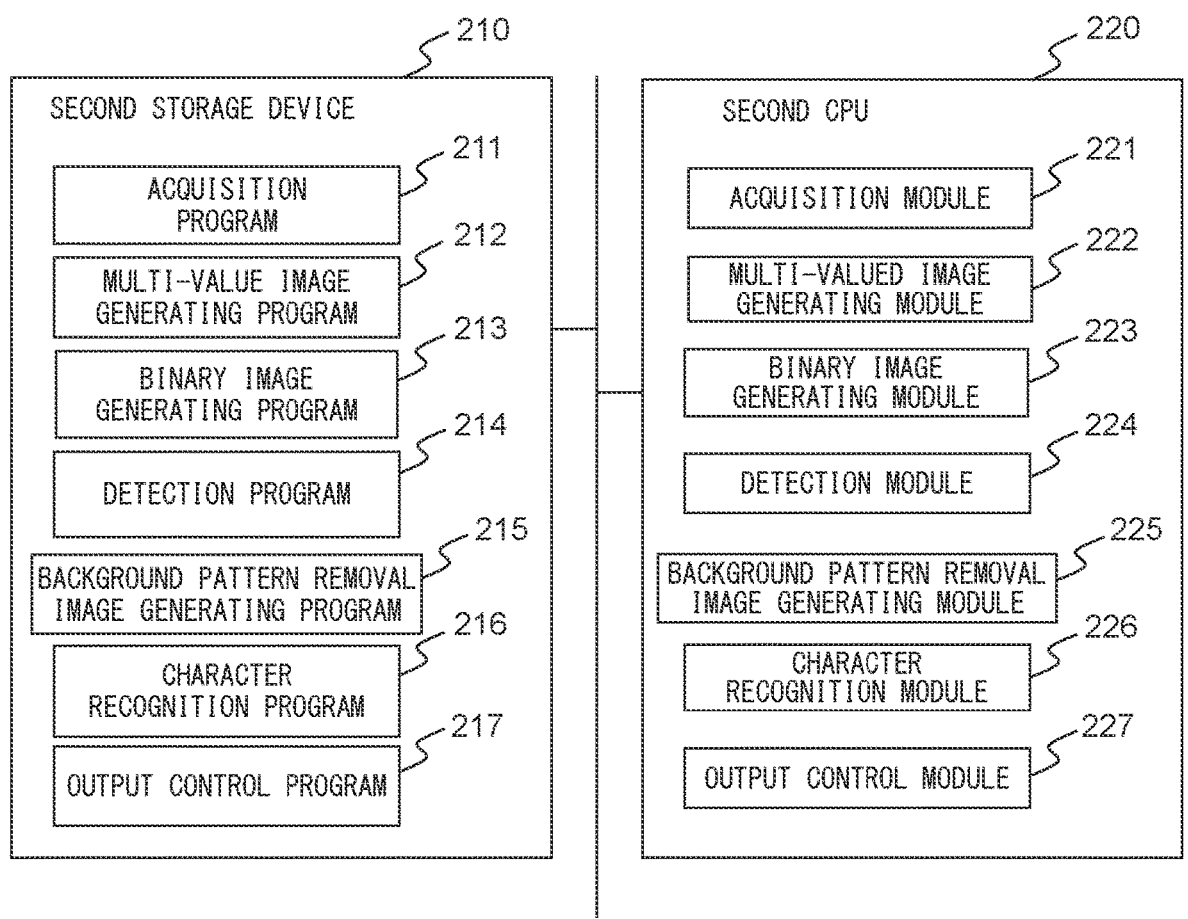
FIG. 2 is a diagram illustrating a schematic configuration of a second storage device 210 and a second CPU 220.

FIG. 2 is a diagram illustrating a schematic configuration of a second storage device 210 and a second CPU 220.

As shown in FIG. 2, each program such as an acquisition program 211, a multi-value image generating program 212, a binary image generating program 213, a detection program 214, a background pattern removal image generating program 215, a character recognition program 216 and an output control program 217, etc., is stored in the second storage device 210. Each of these programs is a functional module implemented by software operating on a processor. The second CPU 220 reads each of the programs stored in the second storage device 210 and operates according to each of the read programs. Thus, the second CPU 220 functions as an acquisition module 221, a multi-valued image generating module 222, a binary image generating module 223, a detection module 224, a background pattern removal image generating module 225, a character recognition module 226 and an output control module 227.

Figure 3:
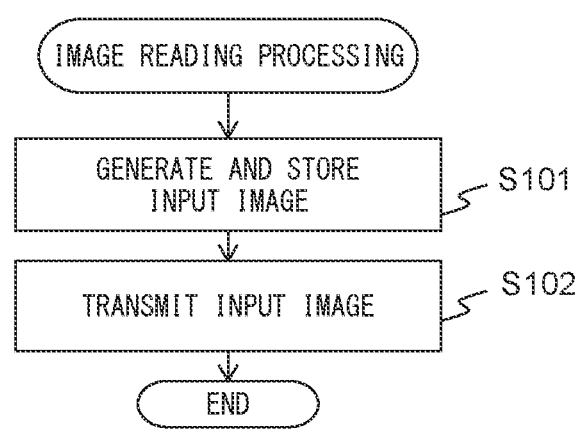
FIG. 3 is a flowchart illustrating an operation of an image reading processing.

FIG. 3 is a flowchart illustrating an operation of an image reading processing performed by the image reading apparatus 100. Hereinafter, the operation of the image reading processing will be described with referring to the flowchart illustrated in FIG. 3. Note that a flow of the operation described below is performed in cooperation with each element of the image reading apparatus 100 mainly by the first CPU 120, based on the program being previously stored in the first storage device 110.

First, the imaging device 102 images a business form such as an invoice including a background pattern including a thin line or a dot as a document, to generate an input image, and stores the input image in the first storage device 110 (step S101).

Next, the first CPU 120 transmits the input image stored in the first storage device 110 to the information processing apparatus 200 through the first interface device 101 (step S102), and ends a series of the steps.

Figure 4:
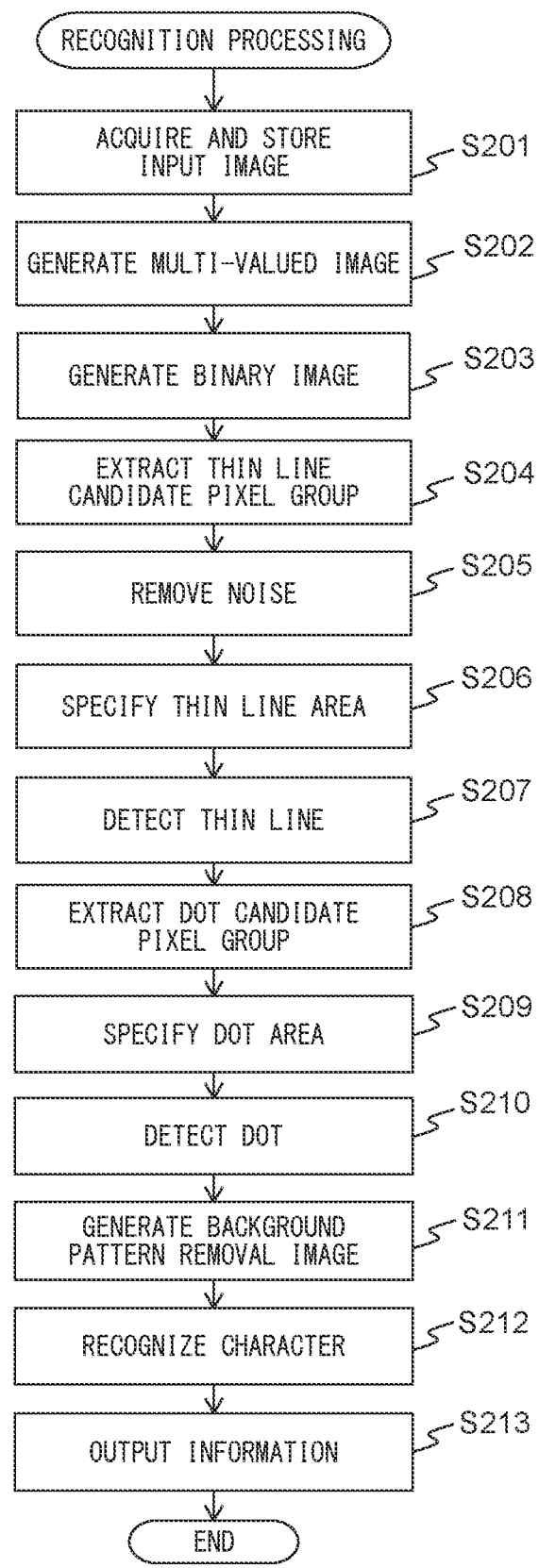
FIG. 4 is a flowchart illustrating an operation of a recognition processing.

FIG. 4 is a flowchart illustrating an operation of a recognition processing by the information processing apparatus 200. Hereinafter, the operation of the recognition processing will be described with referring to the flowchart illustrated in FIG. 4. Note that a flow of the operation described below is performed in cooperation with each element of the information processing apparatus 200 mainly by the second CPU 220, based on the program being previously stored in the second storage device 210.

First, the acquisition module 221 acquires the input image from the image reading apparatus 100 through the second interface device 201 and stores the acquired image in the second storage device 210 (step S201).

Figure 5A:
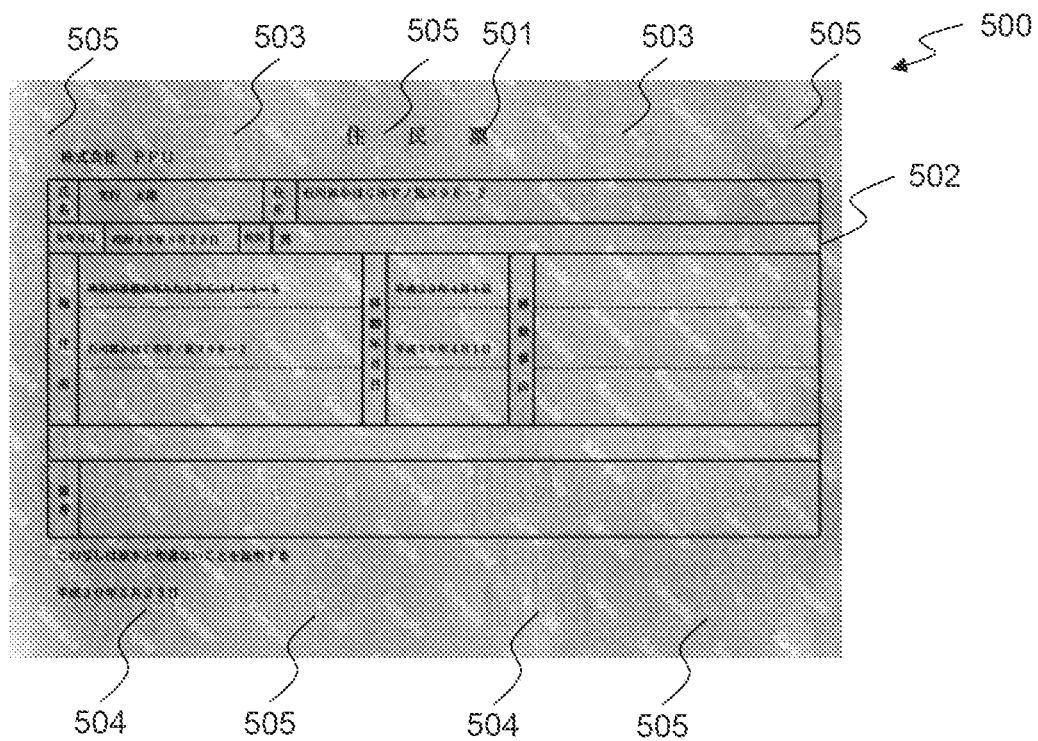
FIG. 5A is a schematic diagram illustrating an example of an input image 500.

FIG. 5A is a schematic diagram illustrating an example of an input image 500.

As shown in FIG. 5A, in the input image 500, characters 501 such as a title, a name, a date of birth, an address, etc., ruled lines 502, and background patterns 503 to 505 appear. A part of the characters 501 and ruled lines 502 overlap on the background patterns 503 to 505. Although each of the background patterns 503 to 505 indicates the same character (copy), the background patterns 503 are formed by thin lines extending in a horizontal direction, the background patterns 504 are formed by thin lines extending in a vertical direction, and the background patterns 505 are formed by dots.

The thin line is a line having a width equal to or less than a predetermined number of pixels. The predetermined number of pixels is, for example, one pixel at 300 dpi (Dots Per Inch). Alternatively, the thin line is a line whose width is less than the minimum or average value of a width of a stroke (line) in the image or the minimum or average value of a width of a stroke excluding pressing or sweeping of characters in the image. Although, the thin lines are displayed distinguishably with respect to the background, the thin lines are light (close to white), and a difference between a concentration of the thin lines and a concentration of the background is smaller than a difference between a concentration of the characters and the concentration of the background. The background patterns 503 and 504 are composed of a plurality of thin lines located at predetermined distances from each other. The thin line may include a thin line extending in a first oblique direction inclined 45 degrees clockwise with respect to the horizontal direction, or a thin line extending in a second oblique direction inclined 45 degrees counterclockwise with respect to the horizontal direction. Hereinafter, a thin line extending in the horizontal direction may be referred to as a horizontal thin line, a thin line extending in the vertical direction may be referred to as a vertical thin line, a thin line extending in the first oblique direction may be referred to as a first oblique thin line, and a thin line extending in the second oblique direction may be referred to as a second oblique thin line.

The dots is a pixel group whose size (area) is equal to or less than a predetermined size (e.g., 4 pixels). Similar to the thin lines, although the dots are distinguishably displayed with respect to the background, the dots are light (close to white), and a difference between a concentration of the dots and the concentration of the background is smaller than the difference between the concentration of the characters and the concentration of the background. The background patterns 505 are composed of a plurality of dots located at a predetermined distance from each other.

Next, the multi-valued image generating module 222 generates a multi-valued image of black and white from an input image that is a color multi-valued image (stepped S202). The multi-valued image generating module 222 specifies the maximum value among an R value, a G value and a B value of each pixel for each pixel in the input image, and generates a multi-valued image in which the specified maximum value is a gradation value (luminance value) of pixel corresponding to each pixel. Hereinafter, a multi-valued image refers to a multi-valued image of black and white.

Figure 5B:
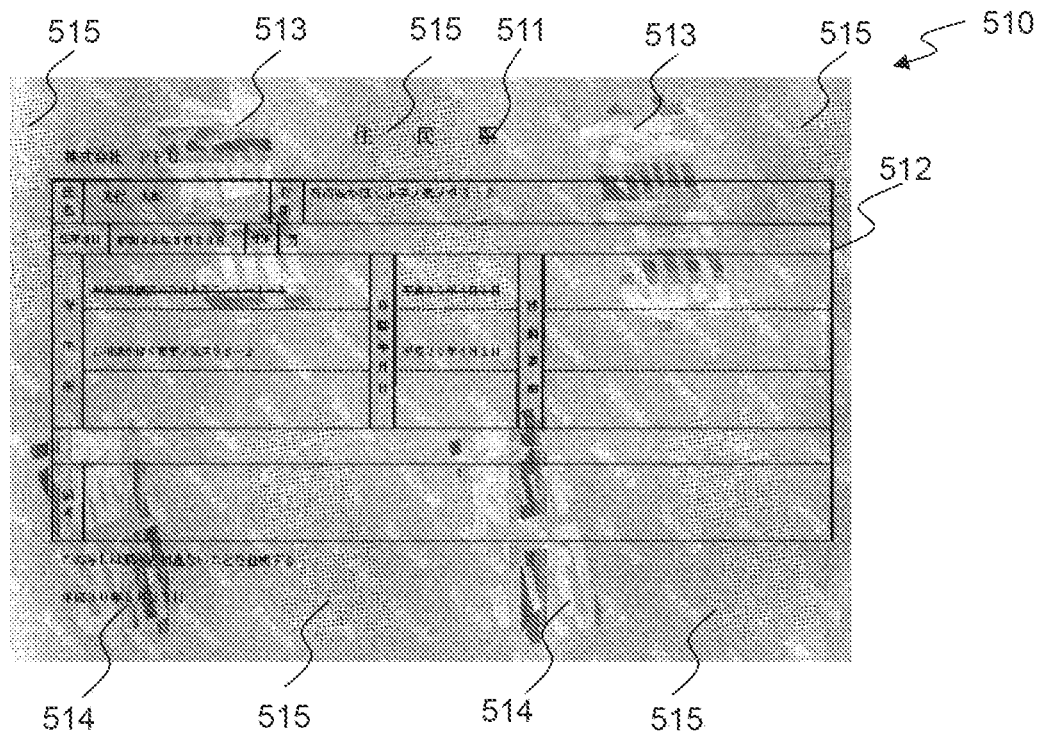
FIG. 5B is a schematic diagram illustrating an example of a multi-valued image 510.

FIG. 5B is a schematic diagram illustrating an example of a multi-valued image 510.

The multi-valued image 510 shown in FIG. 5B is generated from the input image 500. In the multi-valued image 510, color components are removed from the input image 500. Characters 511, ruled lines 512 and background patterns 513 to 515 in the multi-valued image 510 correspond to the characters 501, the ruled lines 502 and the background patterns 503 to 505 in the input image 500, respectively. Compared to the background patterns 503 to 505 in the input image 500, the background patterns 513 to 515 in the multi-valued image 510 are displayed to be more pronounced with respect to the background.

Next, the binary image generating module 223 generates a binary image acquired by binarizing the input image from the input image that is a color multi-valued image (step S203). The binary image generating module 223 generates an image in which a pixel whose luminance value is equal to or more than a predetermined value in the input image is set as a white pixel and a pixel whose luminance value is less than the predetermined value is set as a black pixel, as a binary image. The predetermined value is set to be larger than a luminance value of a pixel forming a general thin line or dot by prior experiments. Thus, in the binary image, pixels corresponding to the characters, ruled lines and background patterns in the input image are black pixels, and pixels corresponding to the other pixel in the input image are white pixels.

Figure 6A:
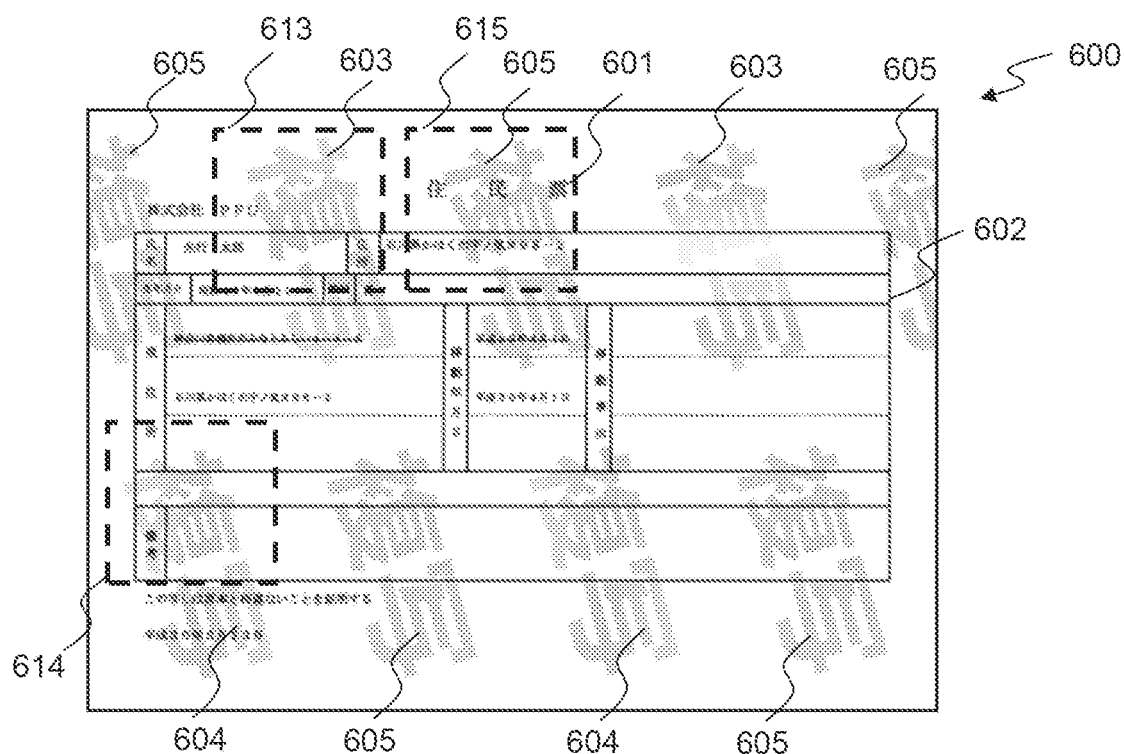
FIG. 6A is a schematic diagram illustrating an example of a binary image 600.

FIG. 6A is a schematic diagram illustrating an example of a binary image 600.

The binary image 600 shown in FIG. 6A is generated from the input image 500. Characters 601, ruled lines 602 and background patterns 603 to 605 in binary image 600 correspond to the characters 501, the ruled lines 502 and the background patterns 503 to 505 in input image 500, respectively.

Figure 6B:
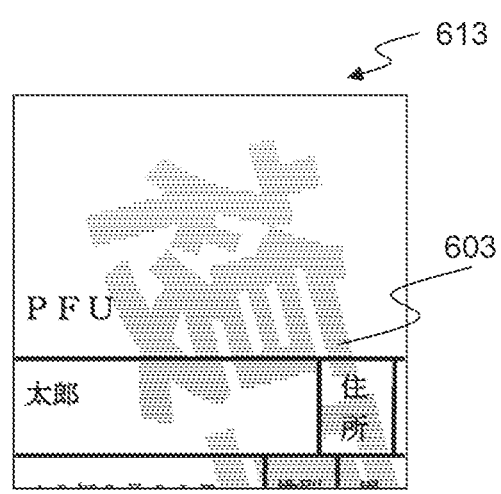
FIG. 6B is an enlarged view of an area 613 in the binary image 600.
Figure 6C:
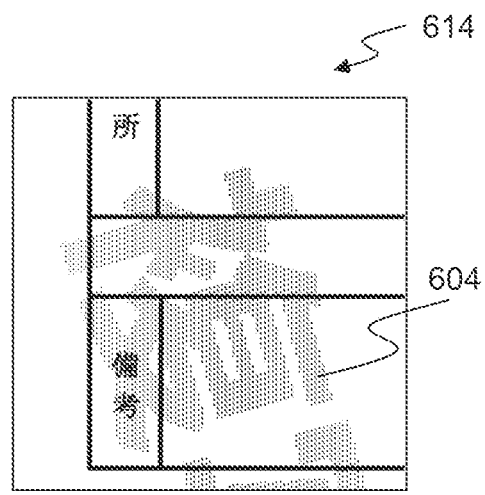
FIG. 6C is an enlarged view of an area 614 in the binary image 600.
Figure 6D:
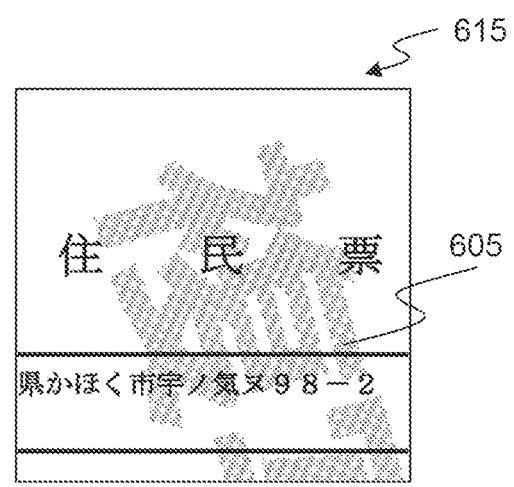
FIG. 6D is an enlarged view of an area 615 in the binary image 600.

FIGS. 6B, 6C and 6D are enlarged views of areas 613, 614 and 615 in the binary images 600, respectively.

As shown in FIG. 6B, the background patterns 603 are formed by a plurality of horizontal thin lines. As shown in FIG. 6C, the background patterns 604 are formed by a plurality of vertical thin lines. As shown in FIG. 6D, the background patterns 605 are formed by a plurality of dots.

Next, the detection module 224 extracts thin line candidate pixel group from the multi-valued images (step S204).

Figure 7A:
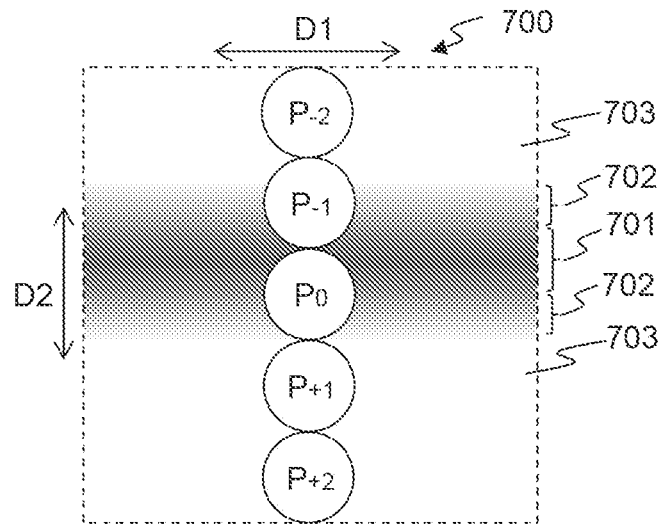
FIG. 7A is a schematic diagram for illustrating a thin line.
Figure 7B:
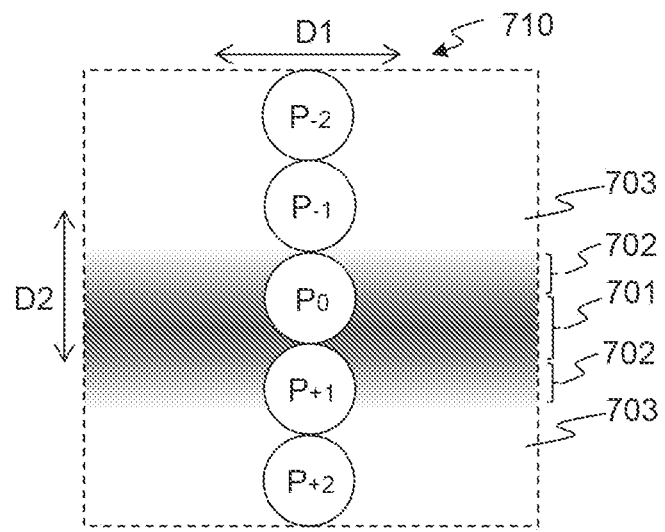
FIG. 7B is a schematic diagram for illustrating a thin line.
Figure 7C:
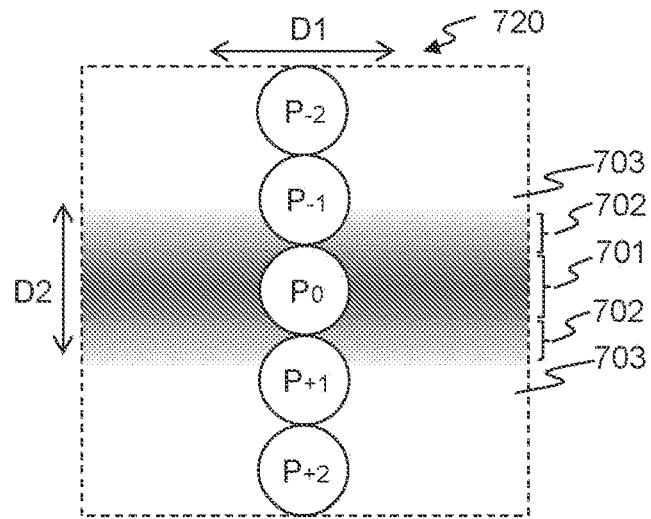
FIG. 7C is a schematic diagram for illustrating a thin line.

FIGS. 7A, 7B and 7C are schematic diagrams for illustrating the thin line.

The images 700, 710, and 720 shown in FIG. 7A, FIG. 7B, and FIG. 7C each include a thin line 701. In each of the images 700, 710 and 720, a width of a thin line 701 is equal to or less than 1 pixel. In a direction D2 perpendicular to an extension direction D1 of the thin line 701, a gradation value of the thin line 701 is a gradation value (low luminance value) corresponding to a concentration of the thin line. On the other hand, in the direction D2, gradation values of surrounding areas 702 of the thin line 701 are gradually close to a gradation value (high luminance value) corresponding to a concentration of a background 703, from the center position of the thin line 701 toward the outside, due to the effect of the thin line 701. A relationship between the thin line 701 and the surrounding areas 702, and each pixel is any of the images 700, 710 or 720 according to a position of the image capturing element of the imaging device 102 when the thin line is imaged.

Figure 7D:
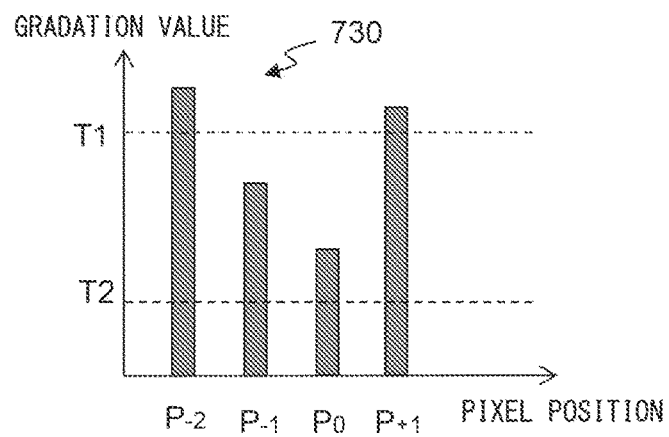
FIG. 7D is a graph illustrating gradation values of pixels corresponding to the thin line and the surrounding area.
Figure 7E:
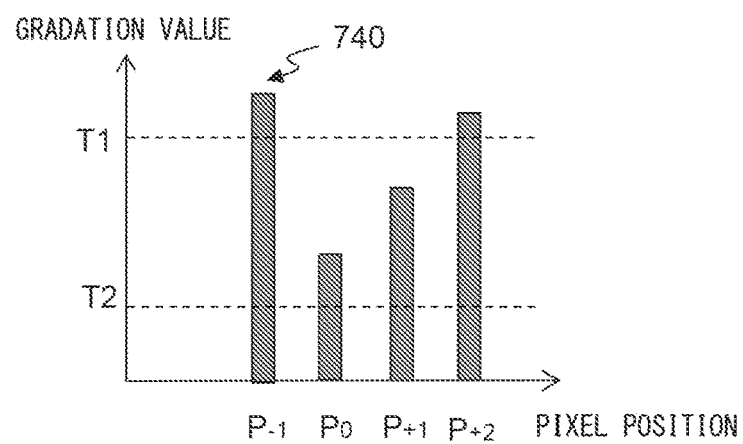
FIG. 7E is a graph illustrating gradation values of pixels corresponding to the thin line and the surrounding area.
Figure 7F:
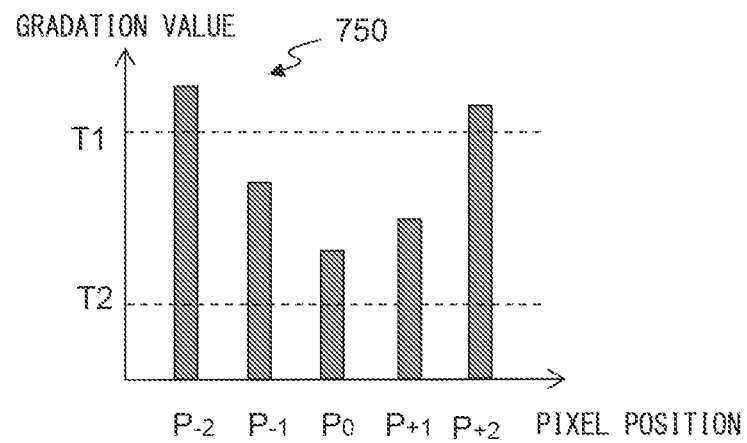
FIG. 7F is a graph illustrating gradation values of pixels corresponding to the thin line and the surrounding area.

FIGS. 7D, 7E and 7F are graphs illustrating the gradation values of the pixels corresponding to the thin line 701 and the surrounding areas 702 in the images 700, 710 and 720, respectively. The horizontal axes of the graphs 730, 740, and 750 shown in FIGS. 7D, 7E, 7F, respectively, indicate pixel positions of the directions D2 in the respective images 700, 710 and 720. The vertical axes indicate the gradation values (luminance values).

When the center of the thin line 701 in the direction D2 is positioned on one end side (upper side in FIG. 7A) of a target pixel $P_0$, as shown in the image 700, gradation values of the target pixel $P_0$ and a pixel $P_{-1}$ adjacent to the one end side of the target pixel $P_0$ are less than a threshold value T1, as shown in the graph 730. On the other hand, gradation values of a pixel $P_{-2}$ and $P_1$ adjacent to the pixel group $P_{-1}$, $P_0$ in the direction D2 are equal to or more than the threshold value T1.

When the center of the thin line 701 is positioned on the other end side (lower side in FIG. 7B) of the target pixel $P_0$ in the direction D2, as shown in the image 710, gradation values of the target pixel $P_0$ and the pixel $P_{+1}$ adjacent to the other end side of the target pixel $P_0$ are less than the threshold value T1, as shown in the graph 740. On the other hand, gradation values of the pixel $P_{-1}$ and $P_{+2}$ adjacent to the pixel group $P_0$, $P_{+1}$ in the direction D2 are equal to or more than the threshold value T1.

When the center of the thin line 701 is positioned in the center of the target pixel $P_0$ in the direction D2, as shown in the image 720, the gradation values of the pixel $P_{-1}$, $P_{+1}$ adjacent to both ends of the target pixel $P_0$ are less than the threshold value T1, as shown in the graph 750. On the other hand, the gradation values of the pixel $P_{-2}$ and $P_{+2}$ adjacent to the pixel group $P_{-1}$, $P_0$, $P_{+1}$ in the direction D2 are equal to or more than the threshold value T1.

Therefore, the detection module 224 extracts a pixel group in which a predetermined number of pixels whose gradation values are less than the threshold value T1 are continuous in a predetermined direction D2 in the multi-valued image, as a thin line candidate pixel group, wherein gradation values of two pixels adjacent to the pixel group in the predetermined direction D2 are equal to or more than the threshold value T1. The predetermined direction D2 includes the vertical direction, the horizontal direction, the second oblique direction and the first oblique direction. The predetermined number is set in advance according to a size of a width of the thin line to be detected, for example, is set to 2 or 3. The threshold value T1 is set in advance according to a density of the thin line to be detected, for example, is set to 144.

The detection module 224 extracts a pixel group in which the predetermined number of pixels whose gradation values are less than the threshold value T1 are continuous in the vertical direction, as a horizontal thin line candidate pixel group, wherein gradation values of two pixels adjacent to the pixel group in the vertical direction are equal to or more than the threshold value T1. Similarly, the detection module 224 extracts a pixel group in which the predetermined number of pixels whose gradation values are less than the threshold value T1 are continuous in the horizontal direction, as a vertical thin line candidate pixel group, wherein gradation values of two pixels adjacent to the pixel group in the horizontal direction are equal to or more than the threshold value T1. Further, the detection module 224 extracts a pixel group in which the predetermined number of pixels whose gradation values are less than the threshold value T1 are continuous in the second oblique direction, as a first oblique thin line candidate pixel group, wherein gradation values of two pixels adjacent to the pixel group in the second oblique direction are equal to or more than the threshold value T1. Further, the detection module 224 extracts a pixel group in which the predetermined number of pixels whose gradation values are less than the threshold value T1 are continuous in the first oblique direction, as a second oblique thin line candidate pixel group, wherein gradation values of two pixels adjacent to the pixel group in the first oblique direction are equal to or more than the threshold value T1.

Figure 8A:
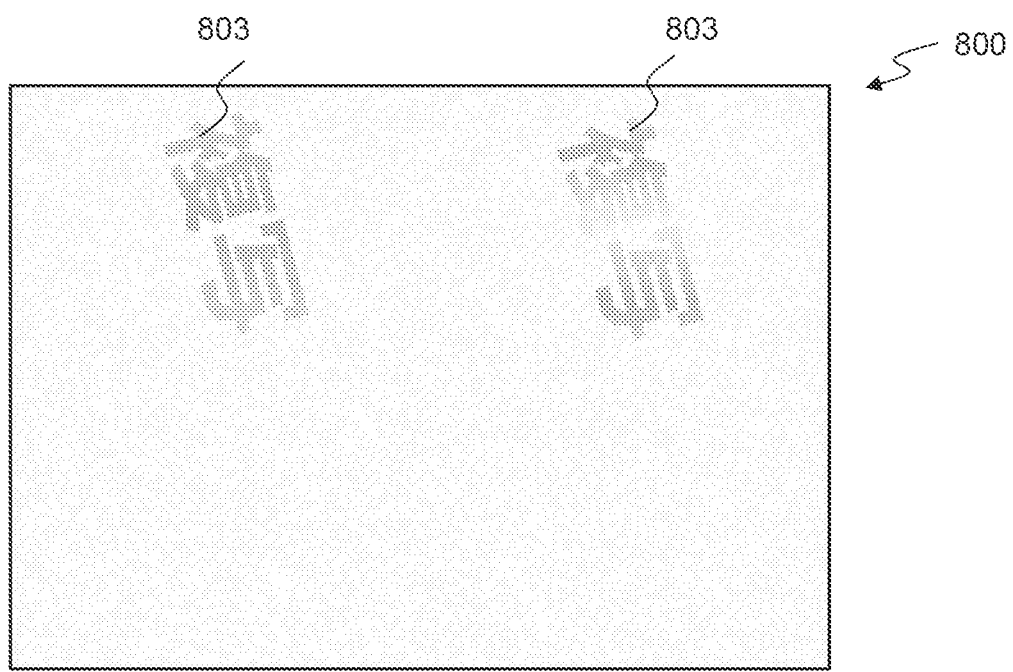
FIG. 8A is a schematic view illustrating a horizontal thin line candidate pixel group.
Figure 8B:
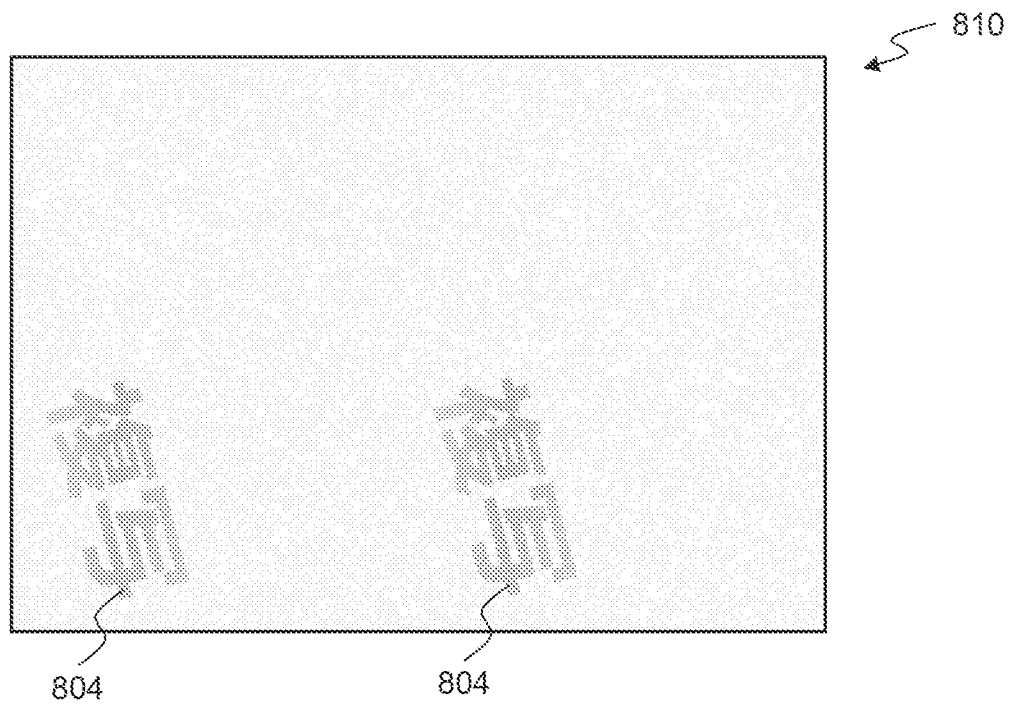
FIG. 8B is a schematic view illustrating a vertical thin line candidate pixel group.

FIG. 8A is a schematic diagram illustrating an example of an image 800 in which the horizontal thin line candidate pixel group is set as a valid pixel. FIG. 8B is a schematic diagram illustrating an example of an image 810 in which a vertical thin line candidate pixel group is set as a valid pixel.

As shown in FIG. 8A, valid pixels in the image 800, i.e., horizontal thin line candidate pixel groups, include pixels 803 corresponding to the background patterns 513 formed by the horizontal thin lines, and do not include pixels corresponding to the characters 511, the ruled lines 512, or other background patterns 514, 515. Similarly, as shown in FIG. 8B, valid pixels in the image 810, i.e., vertical thin line candidate pixel groups, include pixels 804 corresponding to the background patterns 514 formed by vertical thin lines, and do not include pixels corresponding to the characters 511, the ruled lines 512, or other background patterns 513, 515. Although not shown, similarly, the first oblique thin line candidate pixel group and the second oblique thin line candidate pixel group include pixels corresponding to the background patterns formed by each of the thin lines, and do not include pixels corresponding to the characters 511, the ruled lines 512, or the other background patterns. Also, each thin line candidate pixel group does not include pixels corresponding to parts in which the background patterns formed by each thin line and the characters 511 or the ruled lines 512 overlap.

The detection module 224 may not extract a pixel group in which a gradation value of a center side pixel is larger than a gradation value of an outside pixel among two pixels adjacent to each other, as the thin line candidate pixel group. In other words, in the example shown in the graph 750, when the gradation value of the center side pixel $P_0$ is larger than the gradation value of the outside pixel $P_{-1}$ or $P_{+1}$ among the pixel group $P_{-1}$, $P_0$, $P_{+1}$, the detection module 224 does not extract the pixel group $P_{-1}$, $P_0$, $P_{+1}$ as a thin line candidate pixel group. As described above, the gradation values of the thin line 701 and the surrounding areas 702 gradually increases from the center position of the thin line 701 toward the outside, in the input image. The detection module 224 does not extract a pixel group in which the gradation value of the center side pixel is larger than the gradation value of the outside pixel as the thin line candidate pixel group. Thus, the detection module 224 can suppress erroneously extracting a pattern other than the thin line, etc., as the thin line candidate.

Further, the detection module 224 may not extract a pixel group as the thin line candidate pixel group when the gradation values of the pixels extracted as the pixel group are less than a second threshold value T2. The second threshold T2 is set to a value (e.g., 95) smaller than the threshold T1. Thus, the detection module 224 can suppress erroneously extracting a narrow and dark (low brightness) ruled line as the thin line candidate.

Next, the detection module 224 removes a thin line candidate pixel group in which a number of pixels continuous in the direction D1 perpendicular to the predetermined direction D2, i.e., in the extending direction of each thin line, is less than a predetermined number, among the thin line candidate pixel groups extracted from the multi-valued image, as noise (step S205). The predetermined number is set in advance according to a length of the thin line to be detected, for example, is set to 6.

The detection module 224 removes the horizontal thin line candidate pixel group in which the number of pixels continuous in the horizontal direction is less than the predetermined number from the extracted horizontal thin line candidate pixel groups. Similarly, the detection module 224 removes the vertical thin line candidate pixel groups in which the number of pixels continuous in the vertical direction is less than the predetermined number from the extracted vertical thin line candidate pixel groups. Further, the detection module 224 removes the first oblique thin line candidate pixel group in which the number of pixels continuous in the first oblique direction is less than the predetermined number from the extracted first oblique thin line candidate pixel groups. Further, the detection module 224 removes the second oblique thin line candidate pixel group in which the number of pixels continuous in the second oblique direction is less than the predetermined number from the extracted second oblique thin line candidate pixel groups.

Figure 9A:
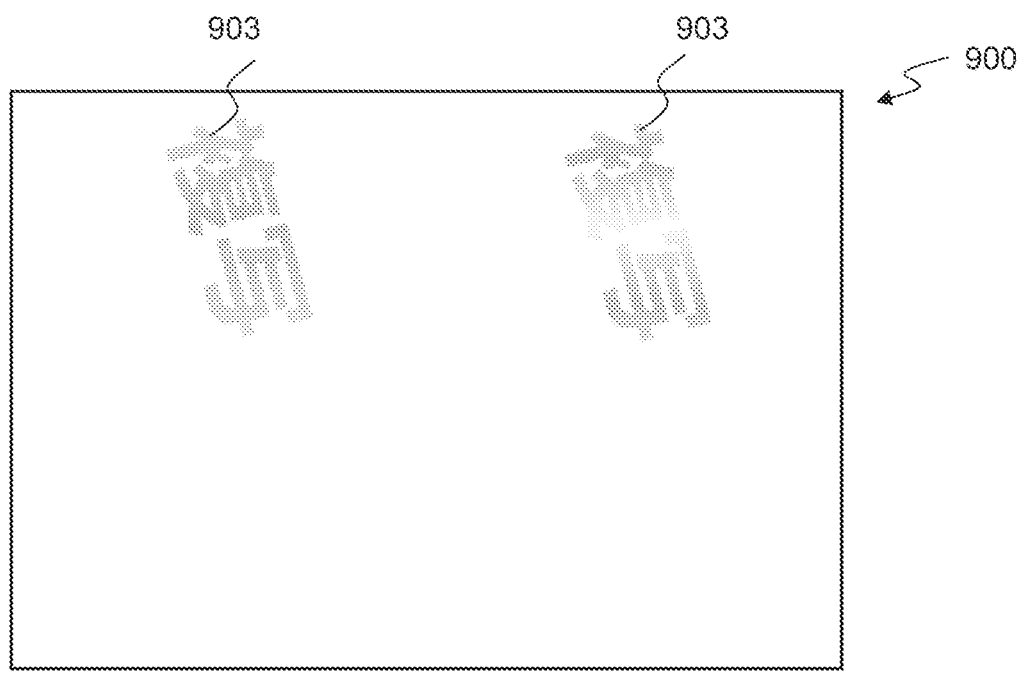
FIG. 9A is a schematic diagram illustrating an example of an image 900.
Figure 9B:
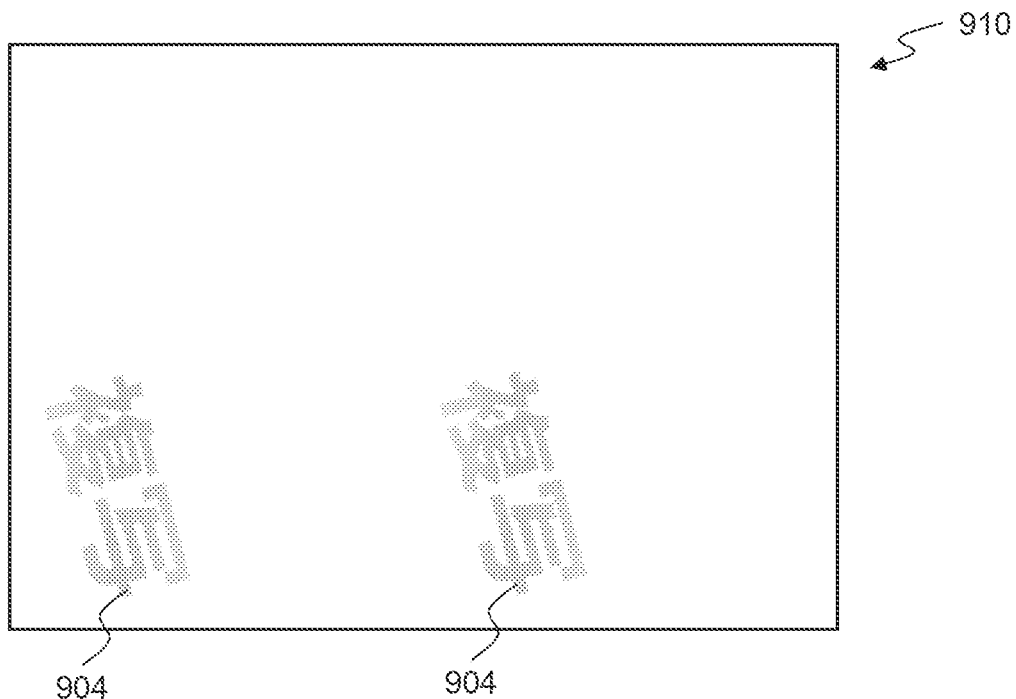
FIG. 9B is a schematic diagram illustrating an example of an image 910.

FIG. 9A is a schematic diagram illustrating an example of an image 900 in which the horizontal thin line candidate pixel group from which noise is removed is set as a valid pixel. FIG. 9B is a schematic diagram illustrating an example of an image 910 in which the vertical thin line candidate pixel group from which noise is removed is set as a valid pixel.

As shown in FIG. 9A, the valid pixels in the image 900, i.e., the horizontal thin line candidate pixel groups from which noise is removed, include only pixels 903 corresponding to the background patterns 513 formed by the horizontal thin lines. Similarly, as shown in FIG. 9B, the valid pixels in the image 910, i.e., the vertical thin line candidate pixel groups from which noise is removed, include only pixels 904 corresponding to the background patterns 514 formed by the vertical thin lines. Although not shown, similarly, the first oblique thin line candidate pixel group and the second oblique thin line candidate pixel group from which noise is removed include only pixels corresponding to the background patterns formed by each of the thin lines.

Next, the detection module 224 specifies a thin line area in which each of the extracted thin line candidate pixel groups is included (step S206). Each thin line area is an area including each thin line detected by the detection module 224.

First, the detection module 224 generates a thin line binary image in which each thin line candidate pixel group is set as an valid pixel and the other pixels are set as an invalid pixel for each of the horizontal thin line candidate pixel group, the vertical thin line candidate pixel group, the first oblique thin line candidate pixel group, and the second oblique thin line candidate pixel group. Next, the detection module 224 generates a thin line dilation image in which a valid pixel is dilated by replacing each pixel from which a valid pixel exists within a first distance, with a valid pixel in each thin line binary image, for each thin line binary image. The first distance is set in advance according to an arrangement interval of a plurality of thin lines to be detected, is set to a value (e.g., 10) equal to or more than 2. In other words, a plurality of thin lines existing within the first distance are combined, in each thin line dilation image.

Next, the detection module 224 generates a thin line erosion image in which valid pixels are eroded by replacing each pixel from which an invalid pixel exists within a second distance, with an invalid pixel in each thin line binary image, for each thin line binary image. The second distance is set to a value larger by a third distance (e.g., 1) than the first distance. In other words, a single thin line from which no other thin line exists within the first distance in a direction perpendicular to the extending direction of the thin line in the original thin line binary image, is removed, in each wire shrinkage image. Next, the detection module 224 generate a thin line area image by dilating the valid pixel, by replacing each pixel from which a valid pixel exists within the third distance, with a valid pixel in each thin line erosion image, for each thin line erosion image. The dilation processing is performed to make the order of the dilation processing and the erosion processing the same.

Next, the detection module 224 specifies an area of a pixel in the multi-valued image corresponding to a valid pixel in each thin line area image as a thin line area. The detection module 224 specifies a horizontal thin line area, a vertical thin line area, a first oblique thin line area and a second oblique thin line area, for each of the horizontal thin line candidate pixel group, the vertical thin line candidate pixel group, the first oblique thin line candidate pixel group and the second oblique thin line candidate pixel group.

Figure 10A:
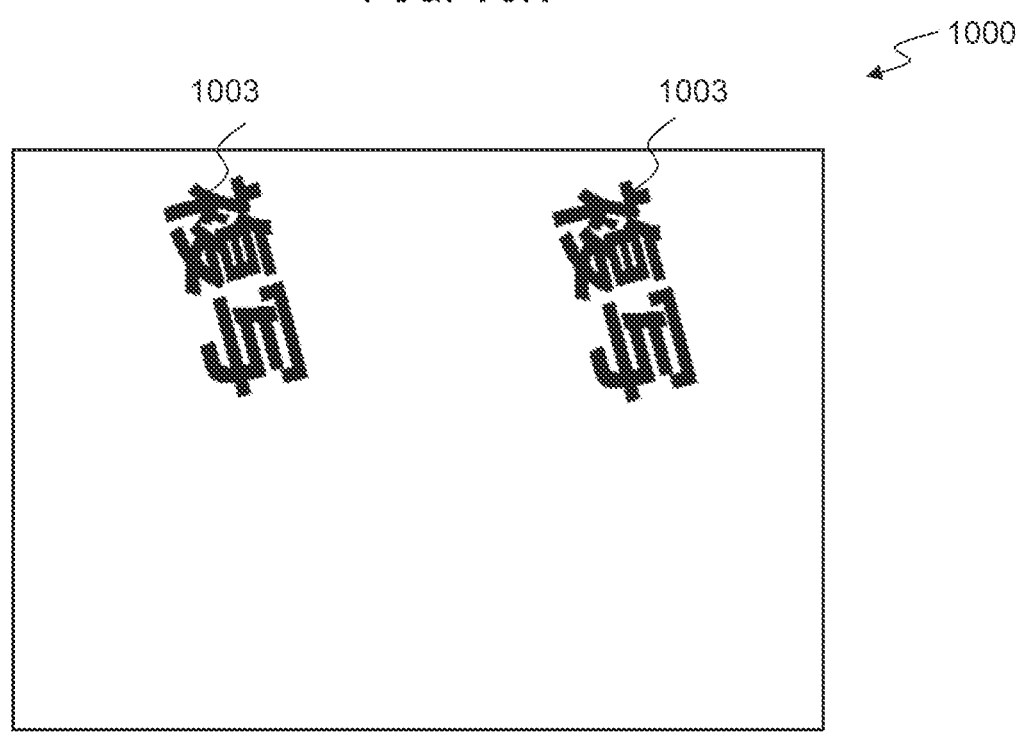
FIG. 10A is a schematic diagram illustrating an example of a thin line area image 1000.

FIG. 10A is a schematic diagram illustrating an example of a thin line area image 1000 generated for the horizontal thin line.

As shown in FIG. 10A, in valid pixels 1003 (i.e., horizontal thin line areas) in the thin line area image 1000, areas corresponding to each horizontal thin line and a background existing between each horizontal thin line are included, and characters, ruled lines, other background patterns, etc., are removed. Although not shown, similarly for each thin line area image generated for the vertical thin line, the first oblique thin line, and the second oblique thin line, areas corresponding to each thin line and the background existing between each thin line are included, and characters, ruled lines, other background patterns, etc., are removed.

Next, the detection module 224 detects a thin line from the multi-valued images (step S207). The detection module 224 detects a horizontal thin line candidate pixel group located in the horizontal thin line area among the horizontal thin line candidate pixel groups extracted from the multi-valued image as a horizontal thin line, and detects a vertical thin line candidate pixel group located in the vertical thin line area among the vertical thin line candidate pixel groups as a vertical thin line. Further, the detection module 224 detects a first oblique thin line candidate pixel group located in the first oblique thin line area among the first oblique thin line candidate pixel groups as a first oblique thin line, and detects a second oblique thin line candidate pixel group located in the second oblique thin line area among the second oblique thin line candidate pixel groups as a second oblique thin line.

In step S205, the detection module 224 removes a thin line candidate pixel group in which the number of pixels continuous in the extending direction of each thin line is less than the predetermined number from each thin line candidate pixel group, as noise. Therefore, the detection module 224 detects a thin line candidate pixel group which is continuous by the predetermined number or more in a direction D1 (an extending direction of each thin line) perpendicular to the predetermined direction D2 among the thin line candidate pixel groups extracted in the predetermined direction D2 from the multi-valued image, as the thin line.

Further, in step S206, the detection module 224 specifies each thin line area so that a single thin line from which no other thin line exists within the first distance in a direction perpendicular to the extending direction of the thin line is removed. Therefore, the detection module 224 detects only a thin line candidate pixel group from which other thin line candidate pixel group exists within a predetermined distance in the predetermined direction D2 among the thin line candidate pixel groups extracted in the predetermined direction D2 from the multi-valued image, as the thin line.

Figure 10B:
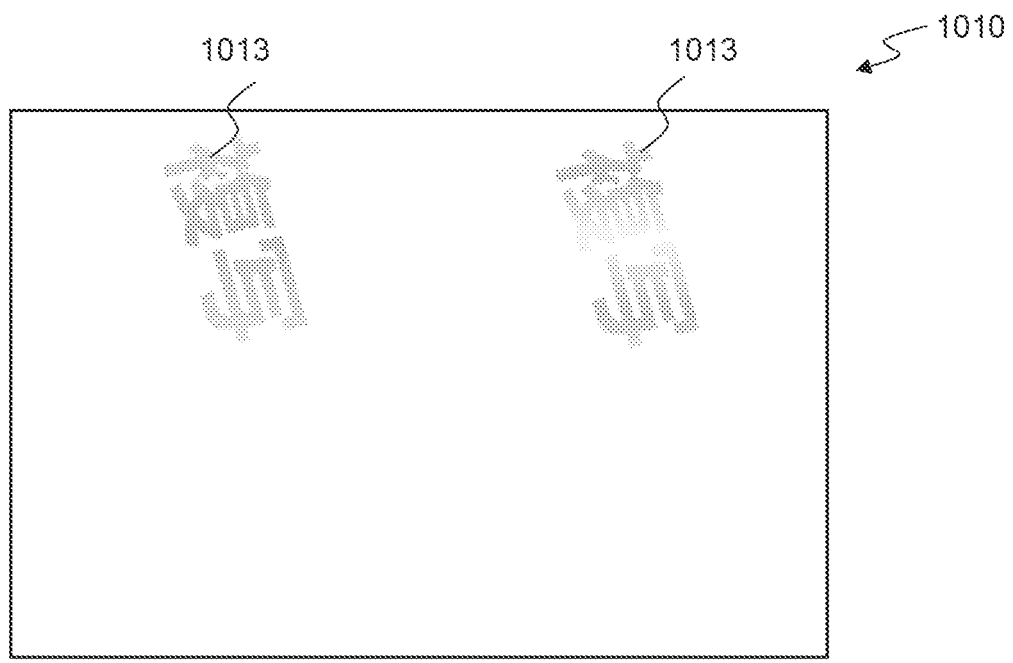
FIG. 10B is a schematic diagram illustrating an example of an image 1010.

FIG. 10B is a schematic diagram illustrating an example of an image 1010 in which a pixel corresponding to a detected horizontal thin line is set as a valid pixel.

As shown in FIG. 10B, valid pixels of the image 1010, i.e., the detected horizontal thin lines, include pixels 1013 corresponding to the background pattern 513 formed by the horizontal thin line, and do not include pixels corresponding to the characters 511, the ruled lines 512, or other background patterns 514, 515. Although not shown, similarly for the vertical thin lines, the first oblique thin lines and the second oblique thin lines, pixels corresponding to the respective thin lines include pixels corresponding to the background patterns formed by the respective thin lines, and do not include pixels corresponding to the characters 601, the ruled lines 602 or other background patterns. Further, the pixels corresponding to the respective thin lines do not include pixels in which the background pattern formed by the respective thin lines and the characters 511 or the ruled lines 512 overlap.

Next, the detection module 224 extracts a dot candidate pixel group from the binary images (step S208). The detection module 224 extracts a connected area in which black pixels adjacent to each other are connected by labeling in the binary image, and extracts a connected area in which the number of pixels is equal to or less than a predetermined size among the connected areas in which the black pixels in the binary image are connected, as a dot candidate pixel group. The predetermined size is set in advance according to a size of the dot to be detected, for example, is set to 4 pixels.

Figure 11A:
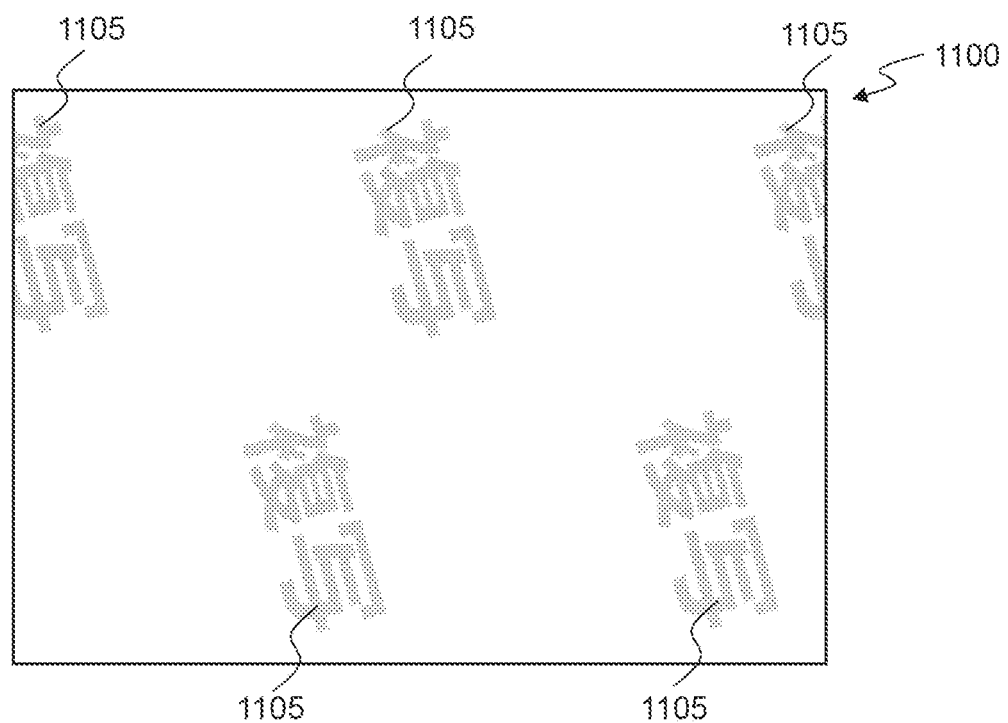
FIG. 11A is a schematic diagram illustrating an example of an image 1100.

FIG. 11A is a schematic diagram illustrating an example of an image 1100 in which the dot candidate pixel group is set as valid pixels.

As shown in FIG. 1A, the dot candidate pixel groups in the image 1100 include pixels 1105 corresponding to the background patterns 605 formed by the dots, and do not include pixels corresponding to the characters 601, the ruled lines 602, or other background patterns 603, 604. The dot candidate pixel groups do not include pixels corresponding to parts in which the background patterns 605 formed by the dots and the characters 601 or the ruled lines 602 overlap.

Next, the detection module 224 specifies a dot area including the extracted dot candidate pixel group (step S209). The dot area is an area in which the dots detected by the detection module 224 are included.

First, the detection module 224 generates a dot binary image in which each dot candidate pixel group is set as a valid pixel and the other pixel is set as an invalid pixel. Next, the detection module 224 generates a dot dilation image in which a valid pixel is dilated by replacing each pixel from which a valid pixel exists within a first distance with a valid pixel in the dot binary image. The first distance is set in advance according to an arrangement interval of a plurality of dots to be detected, is set to a value (e.g., 10) equal to or more than 2. In other words, a plurality of dots existing within the first distance are combined, in each dot dilation image.

Next, the detection module 224 generates a dot erosion image in which valid pixels are eroded by replacing each pixel from which an invalid pixel exists within a second distance with an invalid pixel, in the dot dilation image. The second distance is set to a value larger by a third distance (e.g., 1) than the first distance. In other words, a single dot in which no other dot exists within the first distance is removed in the original dot binary image, in the dot erosion image. Next, the detection module 224 generates a dot area image by dilating a valid pixel, by replacing each from which a valid pixel exists within the third distance with a valid pixel, in the dot erosion image. The dilation processing is performed to make the order of the dilation processing and the erosion processing the same.

Next, the detection module 224 specifies an area of a pixel in the binary image corresponding to a valid pixel in the dot area image as a dot area.

Figure 11B:
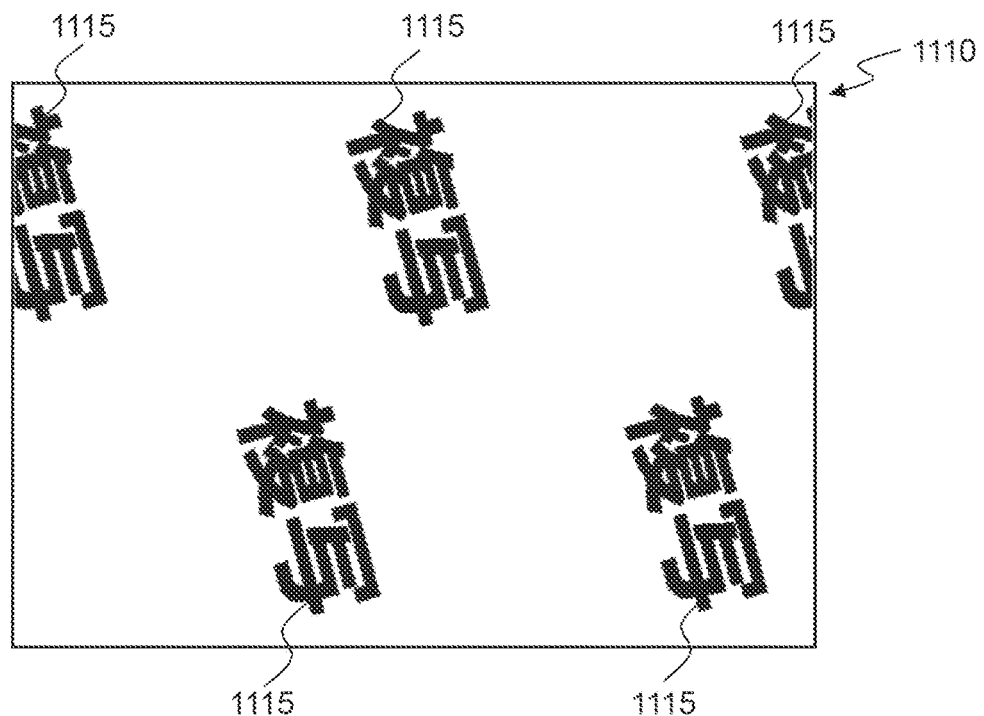
FIG. 11B is a schematic diagram illustrating an example of a dot area image 1110.

FIG. 11B is a schematic diagram illustrating an example of a dot area image 1110.

As shown in FIG. 11B, in valid pixels in the dot area image 1110, i.e., the dot areas, areas 1115 corresponding to each dot and the background existing between each dot are included, and characters, ruled lines, other background patterns, etc., are removed.

Next, the detection module 224 detects a dot from the binary images (step S210). The detection module 224 detects a dot candidate pixel group positioned within the dot area among the dot candidate pixel group extracted from the binary image, as a dot.

In step S209, the detection module 224 identifies the dot area so that a single dot from which no other dots exists in the first distance is removed. Thus, the detection module 224 detects a dot candidate pixel group from which other dot candidate pixel group exists within the second predetermined distance among the dot candidate pixel groups extracted from the binary image, as a dot.

Figure 12:
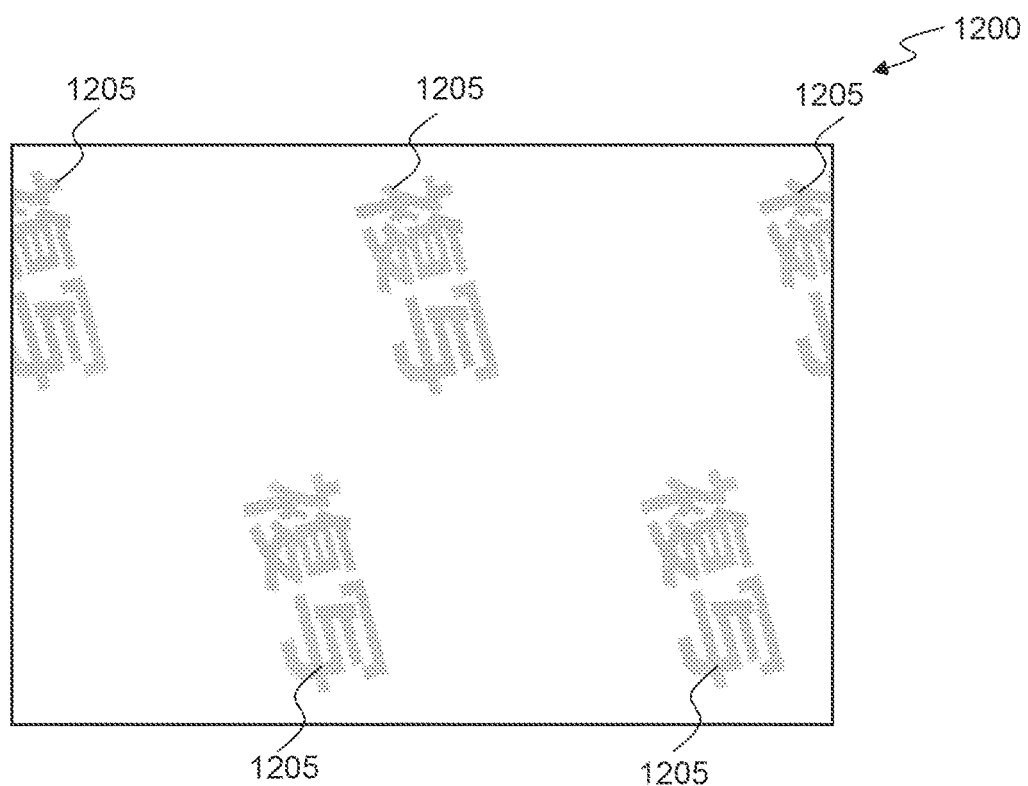
FIG. 12 is a schematic diagram illustrating an example of an image 1200.

FIG. 12 is a schematic diagram illustrating an example of an image 1200 in which a pixel corresponding to the detected dot is set as a valid pixel.

As shown in FIG. 12, valid pixels in the image 1200, i.e., the detected dots, include pixels 1205 corresponding to the background pattern 605 formed by the dots, and do not include pixels corresponding to the characters 601, ruled lines 602, or other background patterns 603, 604. Further, the pixels corresponding to the detected dots do not include pixels in which the background patterns 603 formed by the dots and the characters 601 or the ruled lines 602 overlap.

Next, the background pattern removal image generating module 225 generates the background pattern removal image in which the background pattern including the thin line and the dot are removed from the binary image, based on the thin line detected from the multi-valued image and the dot detected from the binary image (step S211). The background pattern removal image generating module 225 generates the background pattern removal image by replacing a pixel corresponding to the thin line detected from the multi-valued image and the dot detected from the binary image among the black pixels in the binary image with a white pixel.

Further, the background pattern removal image generating module 225 may generate a multi-valued background pattern removal image in which a gradation value of a pixel corresponding to the black pixel replaced with the white pixel in the binary image is replaced with a predetermined value among each pixel in the multi-valued image. The predetermined value is, for example, an average value of the gradation values of the background area in the multi-valued image.

Further, the background pattern removal image generating module 225 may not replace a pixel corresponding to the dot corresponding to each thin line area and not corresponding to each detected thin line among the black pixels in the binary image with the white pixel. Although a pixel corresponding to the thin line may be detected as the dot, the background pattern removal image generating module 225 may erroneously remove a content such as characters or ruled lines when such a pixel is regarded as the dot and removed. Therefore, the background pattern removal image generating module 225 does not remove a pixel corresponding to each thin line area in the multi-valued image, among the black pixels in the binary image, as the dot. In other words, the image generating module 225 does not remove a pixel when the pixel is not detected as a thin line. Thus, the territorial print removal image generating module 225 can suppress erroneously removing a content other than the background pattern.

Figure 13:
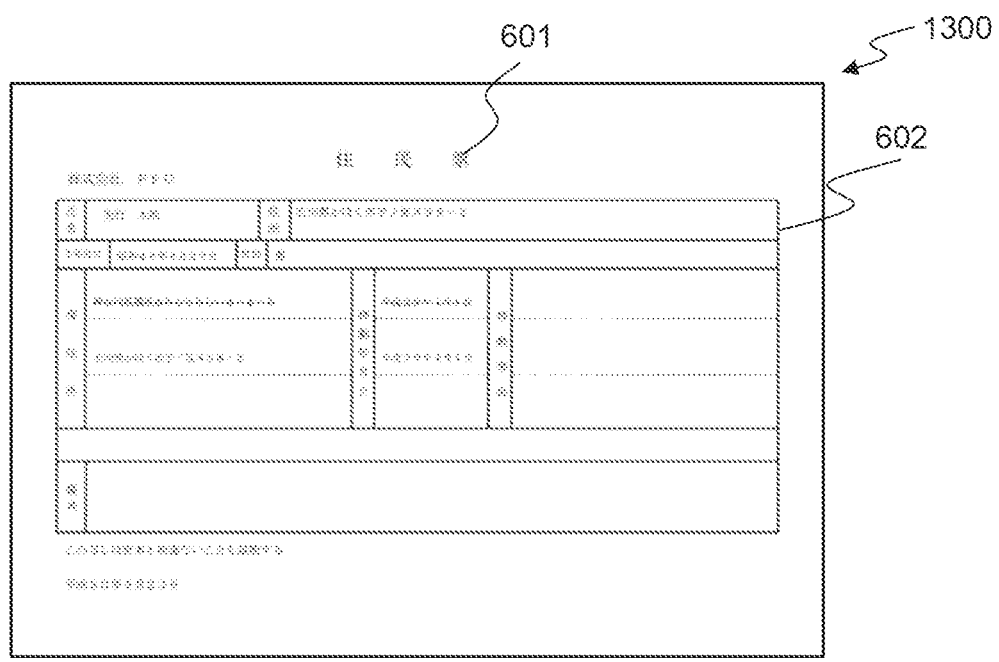
FIG. 13 is a schematic diagram illustrating an example of a background pattern removal image 1300.

FIG. 13 is a schematic view illustrating an example of a background pattern removal image 1300.

As shown in FIG. 13, in the background pattern removal image 1300, only the characters 601 and the ruled lines 602 that were shown in the binary image 600 remain, and the background patterns 603 to 605 are suitably removed.

The background pattern removal image generating module 225 may extract a connected area in which black pixels adjacent to each other are connected by labeling in the generated background pattern removal image, and remove the connected area in which the number of pixels is equal to or less than a second predetermined size among the connected areas as noise. The second predetermined size is set in advance to a size (e.g., 3 pixels) smaller than the predetermined size.

Next, the character recognition module 226 detects a character from the generated background pattern removal image using a known OCR (Optical Character Recognition) technique (step S212).

Next, the output control module 227 displays the detected characters on the display device 203 (step S213) and ends the series of steps. The output control module 227 may display, in addition to or in place of the detected characters, a type (horizontal thin line, vertical thin line, first oblique thin line, second oblique thin line, or dot) of the background pattern detected by the detection module 224, the background pattern removal image, or the multi-valued background pattern removal image on the display device 203. Further, the output control module 227 may transmit the detected character, the type of the background pattern, the background pattern removal image, or the multi-valued background pattern removal image to a server (not shown), etc., through a communication device (not shown). In this way, the output control module 227 outputs the background pattern removal image or information generated using the background pattern removal image.

The detection module 224 may detect at least one type of thin line among the horizontal thin line, the vertical thin line, the first oblique thin line and the second oblique thin line, and omit the detection processing of the other type of thin line. Further, the detection module 224 may detect at least one type of the background pattern among the thin line and the dot and omit the detection processing of the other type of the background pattern. In that case, the information processing device 200 may receive a designation of the type of the background pattern to be detected from a user using the input device 202. The detection module 224 detects only the received type of background pattern, the background pattern removal image generating module 225 generate the background pattern removal image in which the detected type of background pattern is removed from the binary image, based on the detected type of background pattern Since the information processing apparatus 200 does not detect a background pattern other than the target type of background pattern, the information processing apparatus 200 can suppress erroneously detecting the background pattern while reducing the processing time of the background pattern detection processing.

Further, the detection module 224 may omit the processing of step S205 and detect the thin line from the thin line candidate pixel group extracted in step S204. Further, the detection module 224 may omit the processing of step S206 and detect the extracted thin line candidate pixel group as the thin line as it is. Further, the detection module 224 may omit the processing of step S209 and detect the extracted dot candidate pixel group as the dot as it is. Thus, the information processing apparatus 200 can shorten the processing time of the background pattern detection processing.

FIGS. 14A, 14B, 14C, and 14D are schematic diagrams for illustrating a significance of detecting the background pattern from the multi-valued image.

Figure 14A:
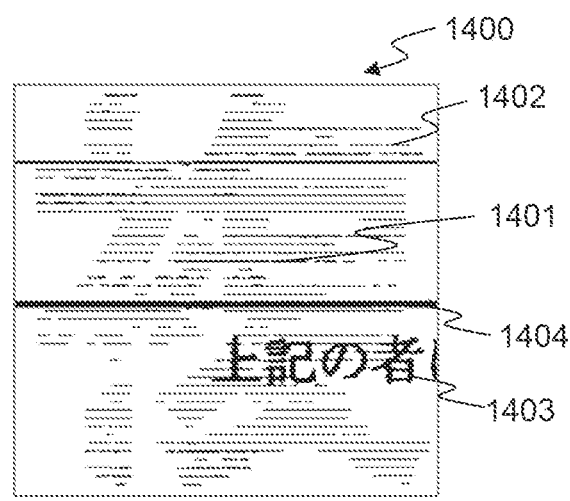
FIG. 14A is a schematic diagram for illustrating a significance of using the multi-valued image.

FIG. 14A illustrates a binary image 1400 acquired by binarizing the input image with a predetermined threshold value. The binary image 1400 includes a thick thin line 1401 and a broken thin line 1402, etc., and it is difficult to correctly distinguish characters 1403 or a ruled line 1404 from each thin line.

Figure 14B:
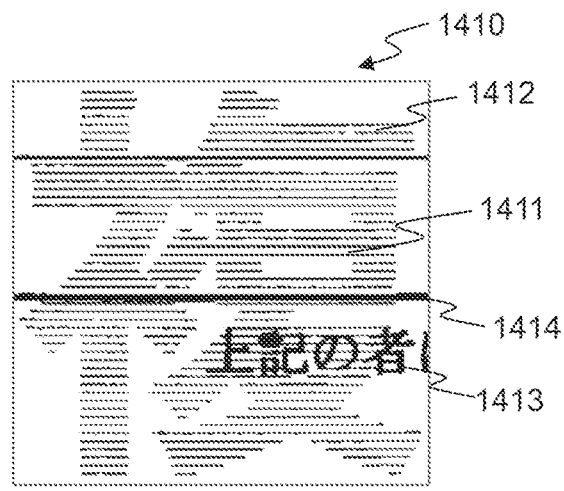
FIG. 14B is a schematic diagram for illustrating a significance of using the multi-valued image.

FIG. 14B illustrates a binary image 1410 acquired by binarizing the input image with a threshold value less than the predetermined threshold value. In the binary image 1410, although the number of broken thin lines 1412 is reduced, the thicker thin lines 1411 become thicker, and it is difficult to correctly distinguish characters 1413 or a ruled line 1414 from each thin line. Further, in the binary image 1410, the characters 1413 itself becomes darker, and it is difficult to correctly recognize the characters 1413 originally.

Figure 14C:
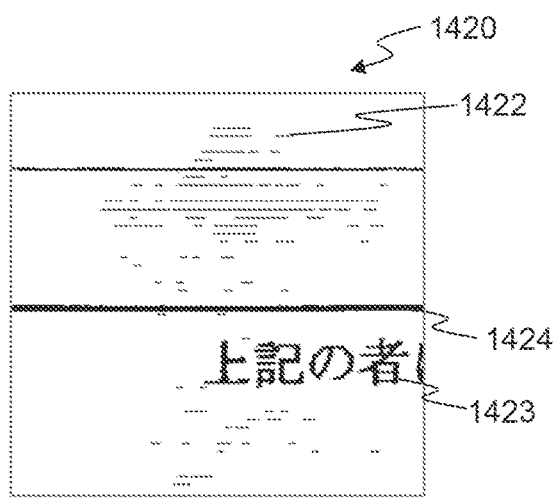
FIG. 14C is a schematic diagram for illustrating a significance of using the multi-valued image.

FIG. 14C illustrates a binary image 1420 acquired by binarizing the input image with a threshold greater than the predetermined threshold value. In the binary image 1420, most of thin lines 1422 are broken, and it is difficult to correctly distinguish characters 1423 or a ruled line 1424 from each thin line. Further, in the binary image 1410, the character 1423 itself is also light, and it is difficult to correctly recognize the characters 1423 originally.

Thus, no matter how the threshold is adjusted to generate the binary image, the size of the thin lines is not stable and it is difficult to accurately detect thin lines from the binary image.

Figure 14D:
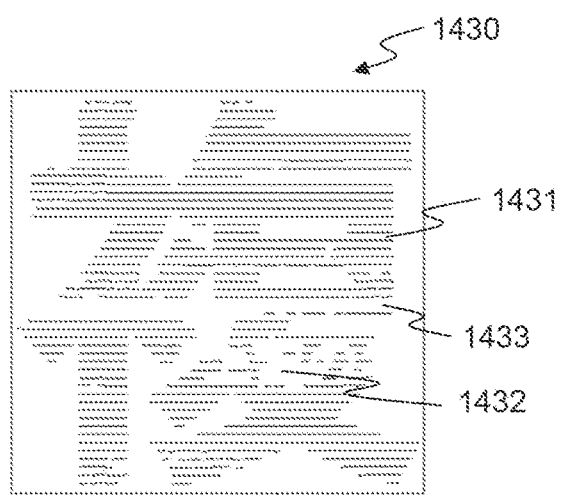
FIG. 14D is a schematic diagram for illustrating a significance of using the multi-valued image.

FIG. 14D illustrates an image 1430 illustrating thin lines detected from the multi-valued image. In the image 1430, the thin lines 1431 are analyzed in detail based on gradation values (multi-value) of the thin lines and the surrounding area, and are suitably extracted. In particular, in the image 1430, a thin line is not detected in areas 1432 corresponding to characters and areas 1433 corresponding to a ruled line, the thin lines 1431 and the characters or the ruled line is suitably distinguished.

As described in detail above, by operating in accordance with the flowchart shown in FIG. 4, the information processing device 200 detects the thin line from the multi-valued image as the background pattern and removes the detected background pattern from the corresponding binary image. The information processing device 200 can accurately detect the thin line by distinguishing it from the character or the ruled line, by analyzing the multi-valued image in detail based on the gradation values (multi-value) of the thin line and the surrounding area. Therefore, the information processing apparatus 200 can more accurately remove the background pattern from the image including the background pattern.

Further, an experiment was conducted to detect a thin line from an image in which various kinds of thin lines were printed by the thin line detection processing according to the present embodiment. As a result, when the information processing apparatus 200 performed the detection processing on a thin line extending in a specific direction as an object, the information processing apparatus 200 could detect a thin line extending in a direction of ±25° with respect to the specific direction. Therefore, the detection module 224 detects all the thin lines of the horizontal thin line, the vertical thin line, the first oblique thin line, and the second oblique thin line, thereby can detect the thin lines extending in all directions.

Further, the information processing device 200 can detect a mixture of different types of business forms or classify the different types of business forms for each of the same type of forms, based on the type of the background pattern (horizontal thin line, vertical thin line, first oblique thin line, second oblique thin line or dot) detected by the detection module 224.

Figure 15:
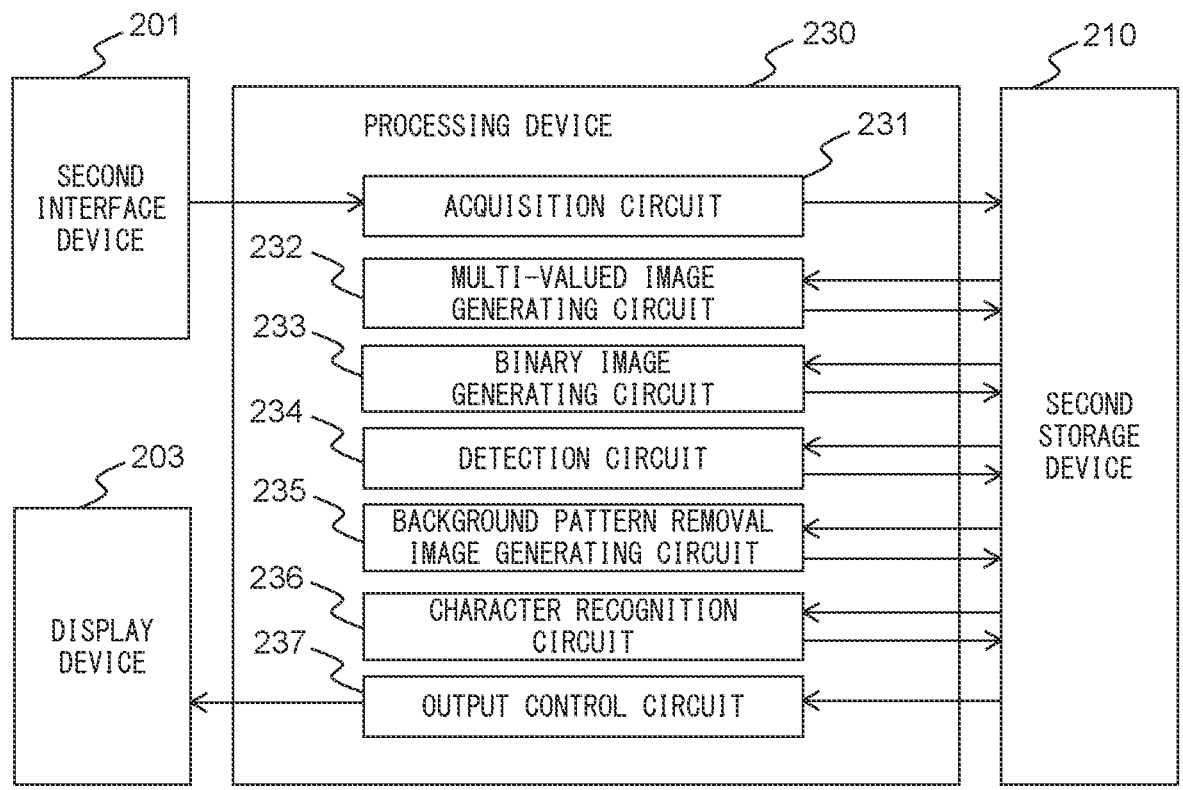
FIG. 15 is a block diagram illustrating a schematic configuration of a processing device 230.

FIG. 15 is a block diagram illustrating a schematic configuration of a processing device 230 in an information processing apparatus according to another embodiment.

The processing device 230 performs a recognition processing instead of the second CPU 220. The processing device 230 includes an acquisition circuit 231, a multi-valued image generating circuit 232, a binary image generating circuit 233, a detection circuit 234, a background pattern removal image generating circuit 235, a character recognition circuit 236, and an output control circuit 237, etc.

The acquisition circuit 231 is an example of the acquisition module and has a function similar to the acquisition module 221. The acquisition circuit 231 acquires the input image from the image reading apparatus 100 via the second interface device 201 and stores it in the second storage device 210.

The multi-valued image generating circuit 232 is an example of a multi-valued image generating module and has a function similar to the multi-valued image generating module 222. The multi-valued image generation circuit 232 reads the input image from the second storage device 210, generates the multi-valued image, and stores the multi-valued image in the second storage device 210.

The binary image generating circuit 233 is an example of the binary image generating module, and has a function similar to the binary image generating module 223. The binary image generating circuit 233 reads the input image from the second storage device 210, generates the binary image, and stores the binary image in the second storage device 210.

The detection circuit 234 is an example of a detection module, and has a functions similar to the detection module 224. The detection circuit 234 reads the multi-valued image from the second storage device 210, detects the thin line and dot from the multi-valued image, and stores the detection result in the second storage device 210.

The background pattern removal image generating circuit 235 is an example of the background pattern removal image generating module and has a function similar to the background pattern removal image generating module 225. The background pattern removal image generating circuit 235 reads out the binary image and the detection result of the thin line and the dot from the second storage device 210, generates the background pattern removal image, and stores the binary image in the second storage device 210.

The character recognition circuit 236 is an example of a character recognition module, and has a function similar to the character recognition module 226. The character recognition circuit 236 reads out the background pattern removal image from the second storage device 210, detects the character from the background pattern removal image, and stores the detection result in the second storage device 210.

The output control circuit 237 is an example of an output control module, and has a function similar to the output control module 227. The output control circuit 237 reads out the detection result of the character, the background pattern removal image or the multi-valued background pattern removal image from the second storage device 210, and outputs the read information to the display device 203.

As described in detail above, the information processing apparatus can more accurately remove the background pattern from the image including the background pattern including the thin line, even when using the processing apparatus 230.

While preferred embodiments have been described above, embodiments are not limited to the above. For example, sharing of functions between the image reading apparatus 100 and the information processing apparatus 200 is not limited to the examples of the image processing systems 1 illustrated in FIG. 1, the components of the image reading apparatus 100 and the information processing apparatus 200 can be provided any of the image reading apparatus 100 and the information processing device 200 as appropriate. Alternatively, the image reading apparatus 100 and the information processing apparatus 200 may be configured as a single apparatus.

For example, the first storage device 110 of the image reading apparatus 100 stores the programs stored in the second storage device 210 of the information processing apparatus 200, and the first CPU 120 of the image reading apparatus 100 may operate as the respective modules realized by the second CPU 120 of the information processing apparatus 200. Further, the image reading apparatus 100 may have the same processing device as the processing device 230 of the information processing apparatus 200.

In that case, the image reading apparatus 100 has the same display device as the display device 203. Since the recognition processing is performed by the image reading apparatus 100, the transmission/reception processing of the input images of steps S102, S201 are omitted. The processing of steps S202 to S213 is performed by the first CPU 120 or the processing device of the image reading apparatus 100. The operation of the processing is similar to that performed by the second CPU 220 or the processing apparatus 230 of the information processing apparatus 200.

Furthermore, the first interface device 101 and the second interface device 201 in the image processing system 1 may be interconnected through a network such as the Internet, a telephone network (including a mobile network and a fixed-telephone network) or an intranet. In that case, each of the first interface device 101 and the second interface device 201 is equipped with an interface circuit for connecting to the network. Additionally, in that case, a plurality of information processing apparatuses may be distributed on the network and the information processing apparatuses may cooperate with one another to perform the recognition processing, etc., in a distributed manner, so that image processing services can be provided in the form of cloud computing. Thus, the image processing system 1 can efficiently perform the recognition processing on the input images read by the plurality of image reading apparatuses.

REFERENCE SIGNS LIST

1 Image processing system
200 Information processing apparatus
221 Acquisition module
222 Multi-valued image generating module
223 Binary image generating module
224 Detection module
225 Background pattern removal image generating module
227 Output control module

The invention claimed is:
1. An image processing apparatus, comprising:
a processor to
acquire an input image,
generate a multi-valued image from the input image, generate a binary image acquired by binarizing the input image, detect a thin line having a width equal to or less than a predetermined number of pixels from the multi-valued image, and generate a background pattern removal image in which the thin line is removed from the binary image, based on the thin line detected from the multi-valued image; and an output device to output the background pattern removal image or information generated using the background pattern removal image.

2. The image processing apparatus according to claim 1, wherein processor extracts a pixel group in which a predetermined number of pixels whose gradation values are less than a threshold value are continuous in a predetermined direction in the multi-valued image, as a thin line candidate pixel group, wherein gradation values of two pixels adjacent to the pixel group in the predetermined direction are equal to or more than the threshold value, and detects a thin line candidate pixel group which is continuous by a predetermined number or more in a direction perpendicular to the predetermined direction among the extracted thin line candidate pixel groups as a thin line.

3. The image processing apparatus according to claim 2, wherein the processor detects only a thin line candidate pixel group from which other thin line candidate pixel group exists within a predetermined distance in the predetermined direction, as the thin line.

4. The image processing apparatus according to claim 2, wherein the processor does not extract a pixel group in which a gradation value of a center side pixel is larger than a gradation value of an outside pixel among two pixels adjacent to each other, as a thin line candidate pixel group.

5. The image processing apparatus according to claim 1, wherein the processor further detects a dot from the binary image, and wherein the processor generates the background pattern removal image by further removing the detected dot from the binary image.

6. The image processing apparatus according to claim 5, wherein the processor extracts a connected area in which the number of pixels is equal to or less than a predetermined size among connected areas in which black pixels in the binary image are connected, as a dot candidate pixel group, and detects a dot candidate pixel group from which other dot candidate pixel group exists within a second predetermined distance among the extracted dot candidate pixel group, as the dot.

7. The image processing apparatus according to claim 5, wherein the processor generates the background pattern removal image by replacing a pixel corresponding to the detected thin line or dot among the black pixels in the binary image with a white pixel.

8. The image processing apparatus according to claim 7, wherein the processor further identifies a thin line area including the detected thin line, and wherein the processor does not replace a pixel corresponding to a dot corresponding to the thin line area and not corresponding to the detected thin line among the black pixels in the binary image, with a white pixel.

9. A control method of an image processing apparatus including an output device, the method comprising:

acquiring, by the image processing apparatus, an input image;

generating a multi-valued image from the input image;

generating a binary image acquired by binarizing the input image;

detecting a thin line having a width equal to or less than a predetermined number of pixels from the multi-valued image;

generating a background pattern removal image in which the thin line is removed from the binary image, based on the thin line detected from the multi-valued image; and outputting the background pattern removal image or information generated using the background pattern removal image from the output device.

10. The method according to claim 9, wherein a pixel group in which a predetermined number of pixels whose gradation values are less than a threshold value are continuous in a predetermined direction in the multi-valued image, is extracted as a thin line candidate pixel group, wherein gradation values of two pixels adjacent to the pixel group in the predetermined direction are equal to or more than the threshold value, and wherein a thin line candidate pixel group which is continuous by a predetermined number or more in a direction perpendicular to the predetermined direction among the extracted thin line candidate pixel groups is detected as a thin line.

11. The method according to claim 10, wherein only a thin line candidate pixel group from which other thin line candidate pixel group exists within a predetermined distance in the predetermined direction is detected as the thin line.

12. The method according to claim 10, wherein a pixel group in which a gradation value of a center side pixel is larger than a gradation value of an outside pixel among two pixels adjacent to each other is not extracted as a thin line candidate pixel group.

13. The method according to claim 9, wherein a dot from the binary image is further detected, and wherein the background pattern removal image is generated by further removing the detected dot from the binary image.

14. The method according to claim 13, wherein a connected area in which the number of pixels is equal to or less than a predetermined size among connected areas in which black pixels in the binary image are connected is extracted as a dot candidate pixel group, and wherein a dot candidate pixel group from which other dot candidate pixel group exists within a second predetermined distance among the extracted dot candidate pixel group is detected as the dot.

15. A computer-readable, non-transitory medium storing a computer program, wherein the computer program causes an image processing apparatus including an output device, to execute a process, the process comprising:

acquiring an input image;

generating a multi-valued image from the input image;

generating a binary image acquired by binarizing the input image;

detecting a thin line having a width equal to or less than a predetermined number of pixels from the multi-valued image;

generating a background pattern removal image in which the thin line is removed from the binary image, based on the thin line detected from the multi-valued image; and outputting the background pattern removal image or information generated using the background pattern removal image from the output device.

16. The medium according to claim 15, wherein a pixel group in which a predetermined number of pixels whose gradation values are less than a threshold value are continuous in a predetermined direction in the multi-valued image, is extracted as a thin line candidate pixel group, wherein gradation values of two pixels adjacent to the pixel group in the predetermined direction are equal to or more than the threshold value, and wherein a thin line candidate pixel group which is continuous by a predetermined number or more in a direction perpendicular to the predetermined direction among the extracted thin line candidate pixel groups is detected as a thin line.

17. The medium according to claim 16, wherein only a thin line candidate pixel group from which other thin line candidate pixel group exists within a predetermined distance in the predetermined direction is detected as the thin line.

18. The medium according to claim 16, wherein a pixel group in which a gradation value of a center side pixel is larger than a gradation value of an outside pixel among two pixels adjacent to each other is not extracted as a thin line candidate pixel group.

19. The medium according to claim 15, wherein a dot from the binary image is further detected, and wherein the background pattern removal image is generated by further removing the detected dot from the binary image.

20. The medium according to claim 19, wherein a connected area in which the number of pixels is equal to or less than a predetermined size among connected areas in which black pixels in the binary image are connected is extracted as a dot candidate pixel group, and wherein a dot candidate pixel group from which other dot candidate pixel group exists within a second predetermined distance among the extracted dot candidate pixel group is detected as the dot.

* * * * *